(12) United States Patent
Schmidt et al.

(10) Patent No.: US 9,407,302 B2
(45) Date of Patent: Aug. 2, 2016

(54) COMMUNICATION DEVICE, MOBILE TERMINAL, METHOD FOR REQUESTING INFORMATION AND METHOD FOR PROVIDING INFORMATION

(71) Applicants: Intel Mobile Communications GmbH, Neubiberg (DE); Intel Corporation, Santa Clara, CA (US)

(72) Inventors: Andreas Schmidt, Braunschweig (DE); Yujian Zhang, Beijing (CN); Ana Lucia Pinheiro, Breinigsville, PA (US)

(73) Assignee: INTEL CORPORATION, Santa Clara, CA (US)

(*) Notice: Subject to any disclaimer, the term of this patent is extended or adjusted under 35 U.S.C. 154(b) by 103 days.

(21) Appl. No.: 13/803,042

(22) Filed: Mar. 14, 2013

(65) Prior Publication Data

US 2014/0153482 A1    Jun. 5, 2014

Related U.S. Application Data

(60) Provisional application No. 61/732,851, filed on Dec. 3, 2012.

(51) Int. Cl.
*H04B 1/12*     (2006.01)
*H04W 24/10*    (2009.01)
(Continued)

(52) U.S. Cl.
CPC ............ *H04B 1/12* (2013.01); *H04B 1/3827* (2013.01); *H04B 7/0452* (2013.01); *H04B 7/0617* (2013.01); *H04B 7/15557* (2013.01); *H04J 11/005* (2013.01); *H04J 11/0053* (2013.01); *H04L 1/0003* (2013.01);

(Continued)

(58) Field of Classification Search
CPC .......... H04W 72/082; H04W 72/1215; H04W 72/1284; H04W 16/14; H04W 24/10; H04W 24/08; H04W 24/06; H04B 1/109; H04L 43/50
USPC ................... 370/252, 328, 329, 336
See application file for complete search history.

(56) References Cited

U.S. PATENT DOCUMENTS

2012/0207040 A1*   8/2012   Comsa et al. ................. 370/252
2013/0053017 A1*   2/2013   Chang ......................... 455/422.1
(Continued)

FOREIGN PATENT DOCUMENTS

WO    WO 2012110396 A1 *   8/2012

OTHER PUBLICATIONS

3GPP TS 32.422 V10.7.0 (Mar. 2012); 3rd Generation Partnership Project; Technical Specification Group Services and System Aspects; Telecommunication management; Subscriber and equipment trace; Trace control and configuration management (Release 10); Mar. 2012; pp. 1-119.

(Continued)

*Primary Examiner* — Un C Cho
*Assistant Examiner* — Peian Lou
(74) *Attorney, Agent, or Firm* — Schwabe, Williamson & Wyatt, P.C.

(57) ABSTRACT

A communication device is described comprising a message generator configured to generate a message indicating that a mobile terminal is to determine whether a transmitter of the mobile terminal has been active at a predetermined time and provide information which depends on the activity of the transmitter of the mobile terminal at the predetermined time and a transmitter configured to transmit the message.

18 Claims, 10 Drawing Sheets

(51) Int. Cl.
| | |
|---|---|
| *H04W 24/06* | (2009.01) |
| *H04W 24/08* | (2009.01) |
| *H04L 12/26* | (2006.01) |
| *H04B 17/00* | (2015.01) |
| *H04B 15/00* | (2006.01) |
| *H04J 11/00* | (2006.01) |
| *H04W 72/08* | (2009.01) |
| *H04W 72/04* | (2009.01) |
| *H04W 72/12* | (2009.01) |
| *H04W 76/02* | (2009.01) |
| *H04W 76/04* | (2009.01) |
| *H04W 84/18* | (2009.01) |
| *H04W 92/18* | (2009.01) |
| *H04W 52/02* | (2009.01) |
| *H04W 52/40* | (2009.01) |
| *H04W 36/10* | (2009.01) |
| *H04L 1/00* | (2006.01) |
| *H04L 5/00* | (2006.01) |
| *H04L 25/02* | (2006.01) |
| *H04B 7/06* | (2006.01) |
| *H04B 1/3827* | (2015.01) |
| *H04W 24/02* | (2009.01) |
| *H04B 7/04* | (2006.01) |
| *H04B 7/155* | (2006.01) |
| *H04L 1/18* | (2006.01) |
| *H04W 84/04* | (2009.01) |

(52) U.S. Cl.
CPC ........... *H04L 1/0054* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 25/0202* (2013.01); *H04W 24/02* (2013.01); *H04W 24/10* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04W 72/1205* (2013.01); *H04W 84/042* (2013.01); *Y02B 60/50* (2013.01)

(56) References Cited

U.S. PATENT DOCUMENTS

| | | | | |
|---|---|---|---|---|
| 2014/0087748 | A1* | 3/2014 | Hong et al. | 455/452.1 |
| 2014/0220963 | A1* | 8/2014 | Jung | H04W 24/10 455/422.1 |
| 2014/0241250 | A1* | 8/2014 | Jung et al. | 370/328 |
| 2014/0302865 | A1* | 10/2014 | Bai | H04W 24/10 455/452.1 |
| 2014/0365760 | A1* | 12/2014 | Auranen | 713/151 |

OTHER PUBLICATIONS

3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); Mar. 2012; pp. 1-194.

3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification (Release 10); Mar. 2012; pp. 1-302.

3GPP TS 36.413 V10.5.0 (Mar. 2012); 3rd Generation Partnership Project; Technical Specification Group Radio Access Network; Evolved Universal Terrestrial Radio Access Network (E-UTRAN); S1 Application Protocol (S1AP) (Release 10); Mar. 2012; pp. 1-255.

3GPP TR 36.805 V9.0.0 (Dec. 2009); 3rd Generation Partnership Project; Technical Specification Group Radio Access Network; Study on Minimization of drive-tests in Next Generation Networks; (Release 9); Dec. 2009; pp. 1-24.

3GPP TS 37.320 V10.4.0 (Dec. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10); Dec. 2011; pp. 1-18.

3GPP TS 36.211 V11.0.0 (Oct. 2012); 3rd Generation Partnership Project; Technical Specification LTE; Evolved Universal Terrestrial Radio Access (E-UTRA); Physical Channels and Modulation; Release 11; Oct. 2012; 108 pages.

3GPP TS 36.212 V11.0.0 (Oct. 2012); 3rd Generation Partnership Project; Technical Specification LTE; Evolved Universal Terrestrial Radio Access (E-UTRA); Multiplexing and Channel Coding; Release 11; Oct. 2012; 81 pages.

3GPP TS 36.213 V11.0.0 (Oct. 2012); 3rd Generation Partnership Project; Technical Specification LTE; Evolved Universal Terrestrial Radio Access (E-UTRA); Physical Layer Procedures; Release 11; Oct. 2012; 145 pages.

* cited by examiner

US 9,407,302 B2

COMMUNICATION DEVICE, MOBILE TERMINAL, METHOD FOR REQUESTING INFORMATION AND METHOD FOR PROVIDING INFORMATION

CROSS-REFERENCE TO RELATED APPLICATION

This application claims the benefit of U.S. provisional application No. 61/732,851, filed 3 Dec. 2012, the content of it being hereby incorporated by reference in its entirety for all purposes.

TECHNICAL FIELD

The present disclosure relates to a communication device, a mobile terminal, a method for requesting information and a method for providing information.

BACKGROUND

Modern mobile terminals typically have a plurality of communication modules which may operate in parallel and may cause interference to each other. For example, a communication in the ISM band may cause interference to an LTE communication in an adjacent band. In particular, measurements, such as signal measurements for cell reselection or handover, may be disturbed by interference. Approaches to address this issue are desirable.

SUMMARY

A communication device is provided including a message generator configured to generate a message indicating that a mobile terminal is to determine whether a transmitter of the mobile terminal has been active at a predetermined time and provide information which depends on the activity of the transmitter of the mobile terminal at the predetermined time and a transmitter configured to transmit the message.

Further, a mobile terminal is provided including a determiner configured to determine whether a first transmitter of the mobile terminal has been active at a predetermined time, a message generator configured to generate a message including information which depends on the activity of the first transmitter of the mobile terminal at the predetermined time and a second transmitter configured to transmit the message.

Additionally, methods according to the above communication device and the above mobile terminal are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

Figure 1:
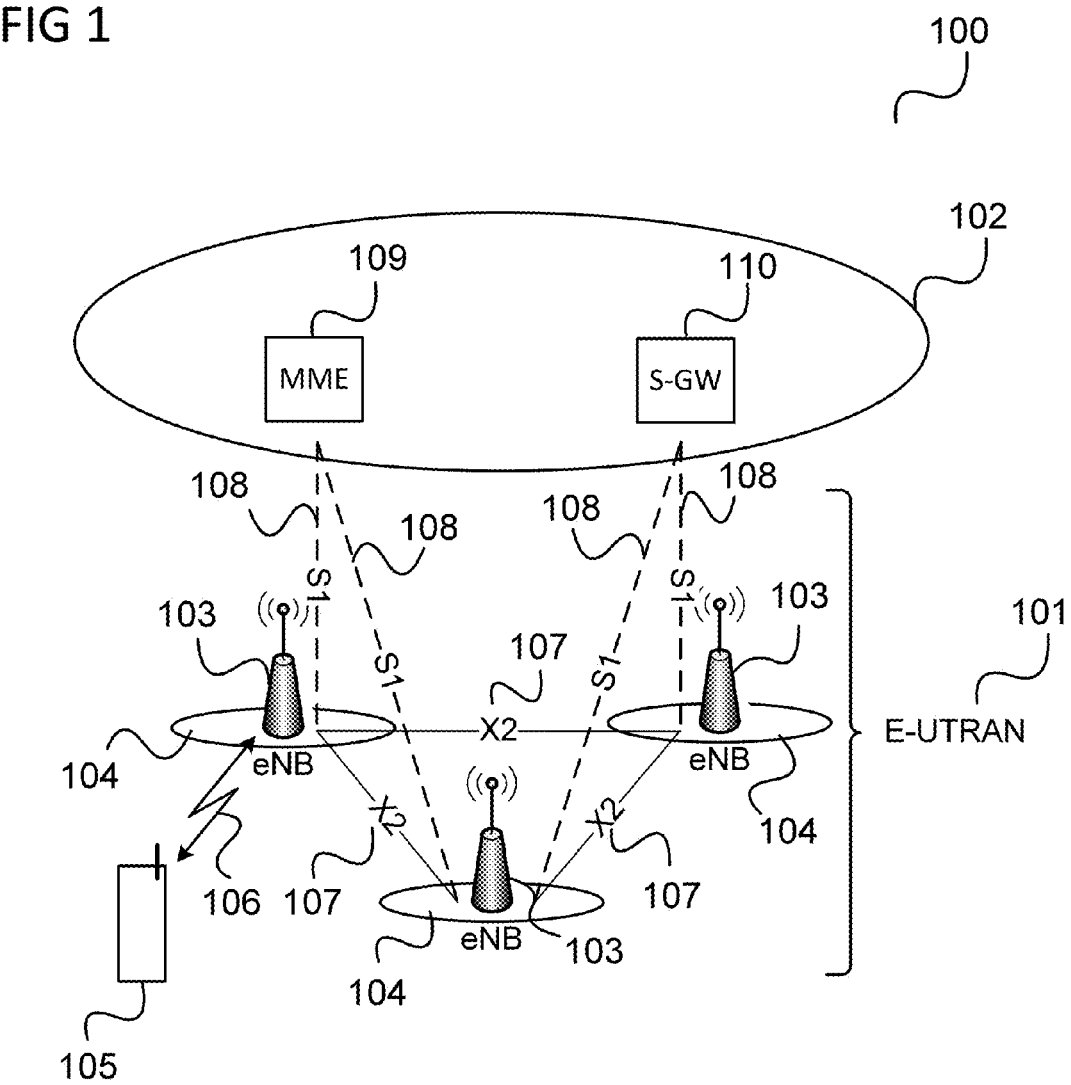
FIG. 1 shows a communication system.

The following detailed description refers to the accompanying drawings that show, by way of illustration, specific details and aspects in which the invention may be practiced. Other aspects may be utilized and structural, logical, and electrical changes may be made without departing from the scope of the invention. The various aspects are not necessarily mutually exclusive, as some aspects can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

3GPP has introduced LTE-Advanced (i.e. LTE with some further enhancements, such as carrier aggregation functionality) into the Release 10 version of its suit of communication standards. This is the "real" '4G'.

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'.

A communication system that may for example be a communication system according to LTE is described in the following with reference to FIG. 1.

FIG. 1 shows a communication system 100.

The communication system 100 is a mobile communication network, e.g. a cellular mobile communication system (also referred to as cellular radio communication network in the following), including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, home base stations, Home eNodeBs, HeNBs according to LTE, or LTE-Advanced) 103. Each base station 103 provides radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW 109, 110 can be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies (RATs). This is illustrated in FIG. 2.

Figure 2:
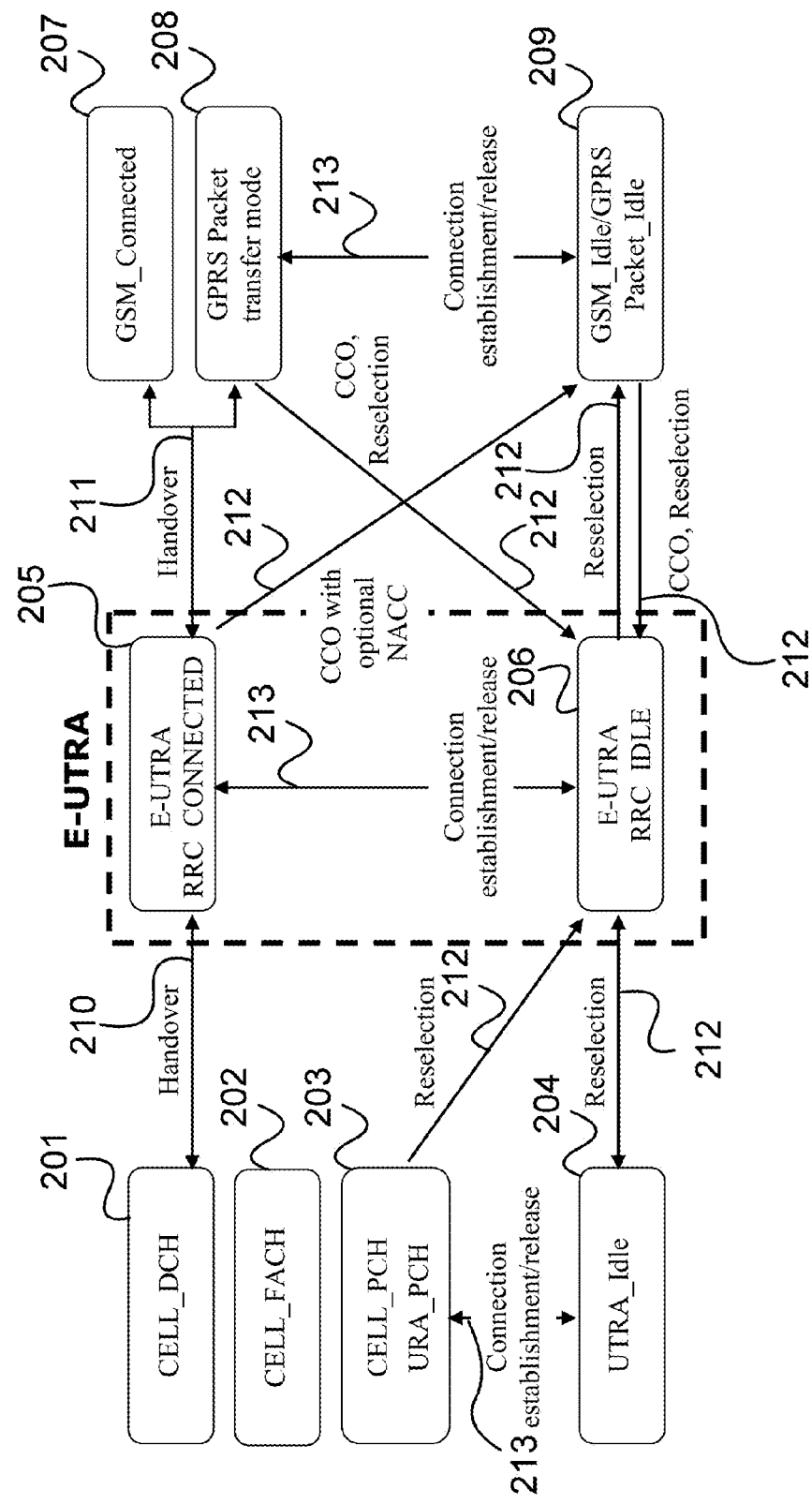
FIG. 2 shows a state diagram.

FIG. 2 shows a state diagram 200.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be characterized as follows:

RRC_IDLE
  Mobile terminal specific DRX (Discontinuous Reception) may be configured by upper protocol layers;
  Mobility is controlled by the mobile terminal 105;
  The mobile terminal 105
    may acquire system information (SI);
    monitors a paging channel to detect incoming calls and SI change;
    performs neighboring cell measurements for the cell (re-)selection process.

RRC_CONNECTED
A mobile terminal 105 is in RRC_CONNECTED when an RRC connection has been established.
  Transfer of unicast data to/from the mobile terminal 105;
  Mobility is controlled by the radio access network 101 (handover and cell change order);
  The mobile terminal 105 may be configured with mobile terminal specific DRX (Discontinuous Reception) at lower protocol layers.
  The mobile terminal 105
    may acquire system information (SI);
    monitors a paging channel and/or SIB (system information block) Type 1 content to detect SI change;
    monitors control channels associated with the shared data channel to determine if data are scheduled for it;
    performs neighboring cell measurements and measurement reporting to assist the network in making handover decisions;
    provides channel quality and feedback information to the radio access network 101.

During work on 3GPP Rel-9 (Release 9) a Feasibility Study on Minimization of Drive Tests (MDT) for future LTE and HSPA (High Speed Packet Access) releases was conducted. In brief, the study aimed at assessing the feasibility, benefits and complexity of automating the collection of DL (downlink) signal strength measurements by the UE to minimize the need of conventional (manual) drive tests.

Conventional drive tests may be characterized as follows:
    UE-like test equipment is installed in cars and driven around by the Mobile Network Operator's (MNO) personnel and measurements are recorded.
    Sometimes additional attenuators are deployed to 'imitate' indoor reception.
    The MNO's measurements focus on latency (for both c-plane and u-plane), bit error rates (BER), call drops, and alike.

In contrast to this, MDT (as defined by 3GPP for LTE and HSPA releases starting with Release 10) means:
  The Mobile Network Operator (MNO) utilizes his customers' UEs out in the field to find out how bad or good network coverage is at a given location.
  The customer is generally not to be informed about ongoing MDT activities in his/her device.

Using conventional (manual) drive tests for network optimization purposes is costly and causes additional $CO_2$ emissions, so it is desirable to develop automated solutions to reduce the operator costs for network deployment and operation. The findings of the study item phase show that it is beneficial to collect UE measurements to enable a more efficient network optimization and it is feasible to use c-plane solutions (of the air interface) to acquire the information from the devices involved.

The key result of the MDT Feasibility Study can be seen in the following: Information collected by UEs pertaining to DL signal strength measurements, together with information available in the Radio Access Network (RAN) can be used by the MNO for network topology planning and coverage optimization purposes.

Detailed technical work on MDT was kicked-off for the 3GPP Rel-10 timeframe with the creation of an MDT Stage 2 description. During this work it became clear that existing measurement configuration methods and measurement reporting methods (defined for Radio Resource Management, RRM) are not sufficient and need to be enhanced to take MDT-specific requirements into account. At that time, the common understanding was that MDT measurements take place in the UE.

For Rel-11, 3GPP enhanced the MDT functionality. New use cases related to UL (Uplink) Coverage Optimizations, QoS Verification and IP Throughput Measurements were identified. All these new use cases have in common that further measurements for MDT are required in certain CN (Core Network) or RAN (Radio Access Network) nodes (in addition to those measurements that take place in the UE itself).

In order to distinguish the MDT functionalities from the RRM functionalities, the terms
  MDT Configuration,
  MDT Measurements
  (including MDT UE Measurements and MDT NW Measurements), and
  MDT Reporting
are used in the following (e.g. for the messages and information elements being exchanged over the network interfaces S1 108 and over the air interface Uu 106).

MDT Operation Modes on the UE Side
Based on the two RRC States RRC_IDLE and RRC_CONNECTED two types of MDT have been defined.
  Immediate-MDT: (defined for UEs in RRC_CONNECTED state):
    1. MDT Configuration
      is based on existing RRC signaling procedures
    2. MDT Measurements
      are taken immediately
    3. MDT Reporting
      is also done immediately
  Logged-MDT (defined for UEs in RRC_IDLE state):
    1. MDT Configuration
      a) is done by dedicated RRC signaling while the UE is in RRC_CONNECTED,
      b) remains valid in RRC_IDLE, c) is maintained during multiple RRC_IDLE→RRC_CONNECTED→RRC_IDLE state transitions
d) is maintained while temporarily being in another RAT
2. MDT Measurements are all done in RRC_IDLE and includes the following
a) data collection
b) storage of data
c) log-file creation (for later submission from UE to E-UTRAN)
3. MDT Reporting
a) at a later point in time (when UE is back in RRC_CONNECTED again)
b) upon E-UTRAN request (using UEInformationRequest and UEInformationResponse RRC message pair)

MDT is not supported in wireless communication systems according to the GERAN (2G and 2.5G) suite of specifications, i.e. is not supported for the GSM states 207, 208, and 209. Immediate-MDT is supported in Cell_DCH 201 and RRC_CONNECTED 205. Logged-MDT is supported in Cell PCH/URA_PCH 203, UTRA_Idle 204 and RRC_IDLE 206.

MDT Functionality on Network Side (i.e. On the Side of the Core Network (CN) and the Radio Access Network (RAN, e.g. The E-UTRAN))

The core network functionality for the configuration of MDT (including instructions what kind of devices should be selected for MDT measurements by an eNB, and where the collected MDT reports should be sent to) are based on the existing Trace functionality. This is illustrated in FIG. 3.

Figure 3:
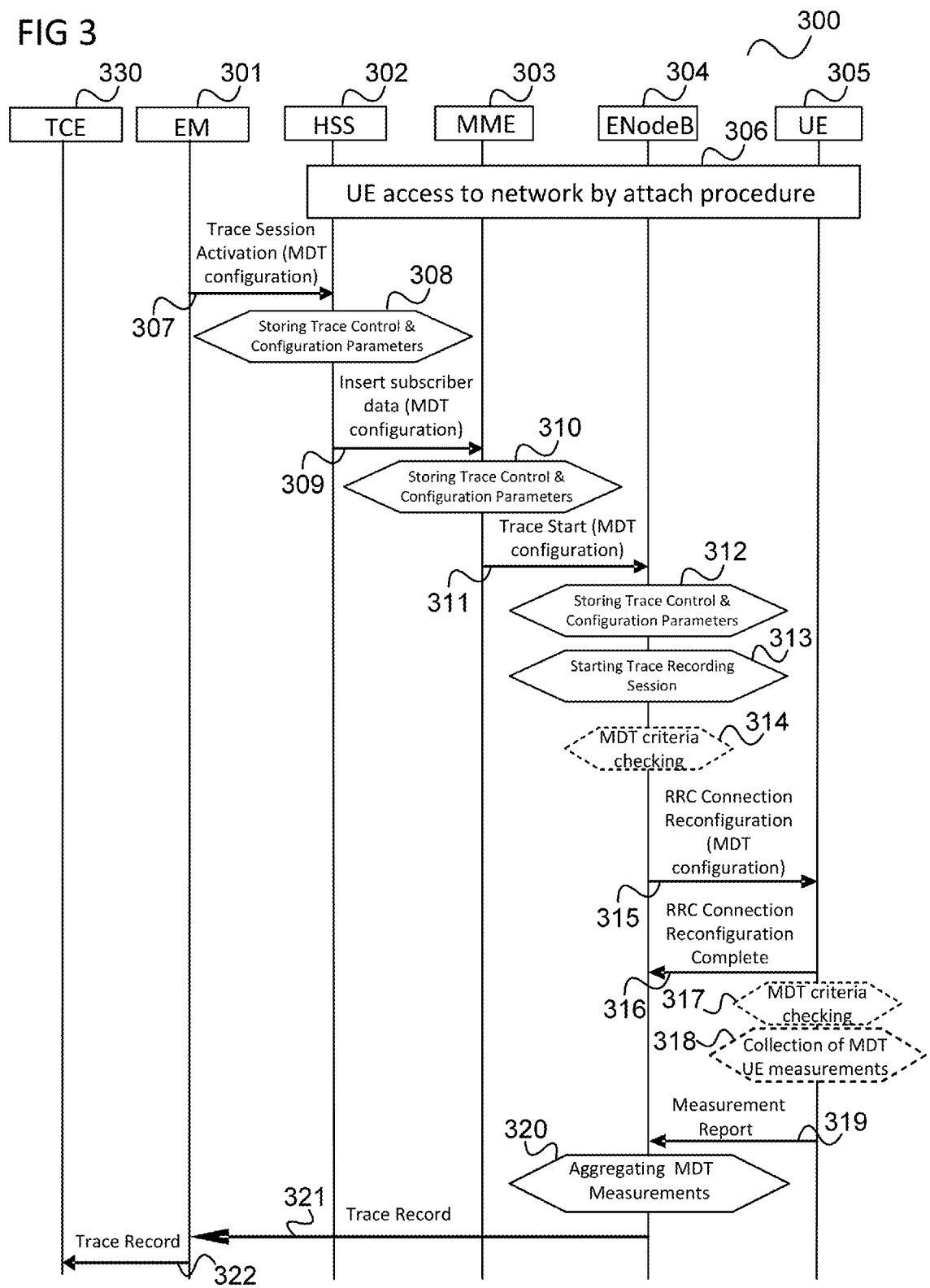
FIG. 3 shows a message flow diagram illustrating Trace-based MDT functionality on the network side.

FIG. 3 shows a message flow diagram 300 illustrating Trace-based MDT functionality on the network side.

The message flow takes place between an element manager (EM) 301, which is for example part of the core network 102, a home subscriber server (HSS) 302, which is for example part of the core network 102, an MME 303 (e.g. corresponding to MME 109), a base station 304 (e.g. corresponding to the eNB 103 serving the UE 105) and a UE 305 corresponding to UE 105. Further, a TCE (Trace Collection Element) 330 may be involved in the flow.

In 306, the UE 305 attaches to the network side (e.g. to E-UTRAN 101 and core network 102) by means of an attach procedure.

In 307, the EM transmits the MDT configuration for the UE 305 to the HSS 302 by means of a Trace Session Activation message.

In 308, the HSS 302 stores trace configuration parameters.
In 309, the HSS 302 forwards the MDT configuration to the MME 303.

In 310, the MME 303 stores the trace configuration parameters.

In 311, the MME 303 transmits the MDT configuration to the base station 304 by means of a trace start message.

In 312, the base station 304 stores the trace configuration parameters.

In 313, the base station 304 starts a Trace Recoding Session.

In 314, the base station 304 may optionally perform MDT criteria checking.

In 315, the base station 304 sends the MDT configuration to the UE 305 (via the air interface).

The UE 305 acknowledges the MDT configuration by means of an RRC Connection Reconfiguration Complete message in 316.

The UE 305 may optionally perform MDT criteria checking in 317.

In 318, the UE 305 performs MDT measurements according to the MDT configuration.

In 319, the UE reports the results of the MDT measurements to the base station 304 by means of a measurement report.

In 320, the base station 304 may store the MDT measurements for later retrieval by the TCE. In this step the base station 304 may also choose to aggregate MDT UE measurements received in a measurement report 319 with MDT NW measurements collected by the base station 304 itself.

In 321 the (aggregated) MDT measurement report is conveyed from the base station 304 to the EM 301.

In case that the TCE 330 is a separate entity from the EM 301, the EM 301 may then forward the (aggregated) MDT measurements to the TCE 330.

According to Rel-10 MDT does not require the base station 304 to measure anything; the only thing that the base station has to do is collect MDT measurements from the UE 305 and use the trace-based MDT reporting mechanisms to convey the MDT report back to the TCE 330 which may for example be an MDT Server. According to Rel-11 some new measurement requirements (related to UL and/or DL traffic characteristics) are put on certain CN or RAN nodes to realize the MDT Rel-11 enhancements (e.g. MDT NW Measurements for UL Coverage Optimizations, QoS Verification and IP Throughput Measurements).

In order to distinguish the MDT messages that are exchanged over the air interface form those MDT messages that are exchanged between core network entities, the following terms are used in the following to refer to messaging within the core network:
Trace-based MDT Configuration, and
Trace-based MDT Reporting.

In order to distinguish the MDT measurements that take place in the UE from those MDT measurements that take place in the CN and/or certain RAN nodes, the following two terms are used in the following:
MDT UE Measurements to refer to measurements for MDT performed by the UE, and
MDT NW Measurements to refer to measurements for MDT performed by certain CN or RAN nodes, primarily measurements of UL and/or DL data transmissions to address the new use cases in Rel-11.

While examples are given in the following based on E-UTRA (i.e. LTE) and in most examples LTE terminology is used, it should be noted that the principles can also be adapted to the HSPA (i.e. UMTS) suite of standards. Physical layer parameters of the uplink radio access (as required for the UL Coverage Optimization use case) can be measured by the respective base station in both UMTS and LTE. However, because of the different protocol termination points in LTE and UMTS, it is not suitable to just replace "eNB" with "NB" when it comes to "higher layer" measurements for QoS Verification, IP Throughput Measurement, and alike. In HSPA these types of "higher layer" measurements (e.g., at application layer) can for example only be done in the RNC.

A MDT UE measurement may for example include a measurement of, for example, the signal strength or signal quality of LTE downlink signals for determining network coverage. However, if the UE includes, in addition to the LTE communication module, another communication module operating in the ISM band, transmissions in the ISM band may affect the reception of LTE DL signals by the UE. In this case MDT measurements (in particular LTE MDT M1 measurements or, in case of UMTS, Inter-RAT measurements) may be polluted (i.e. altered or distorted) by interference from the ISM band and may no longer reflect the real coverage of the LTE network.

As described in the following, for example, if pollution levels are not negligible, the UE informs to the network side that it is experiencing measurement pollution.

For example, in case of LTE, pollution of measurements during MDT operation in LTE for UEs residing in RRC_CONNECTED and RRC_IDLE mode of operation is detected. By taking into consideration the pollution information false measurement reporting can be avoided either on UE side or on infrastructure side.

In case of UMTS, for example, the approaches described in the following for LTE can also be used in a similar manner for UMTS Inter-RAT measurements, i.e. pollution on LTE frequencies that are measured as Inter-RAT frequencies during MDT operation in UMTS for UEs residing in Cell_DCH and Cell_PCH/URA_PCH/UTRA_Idle can also be detected.

Figure 4:
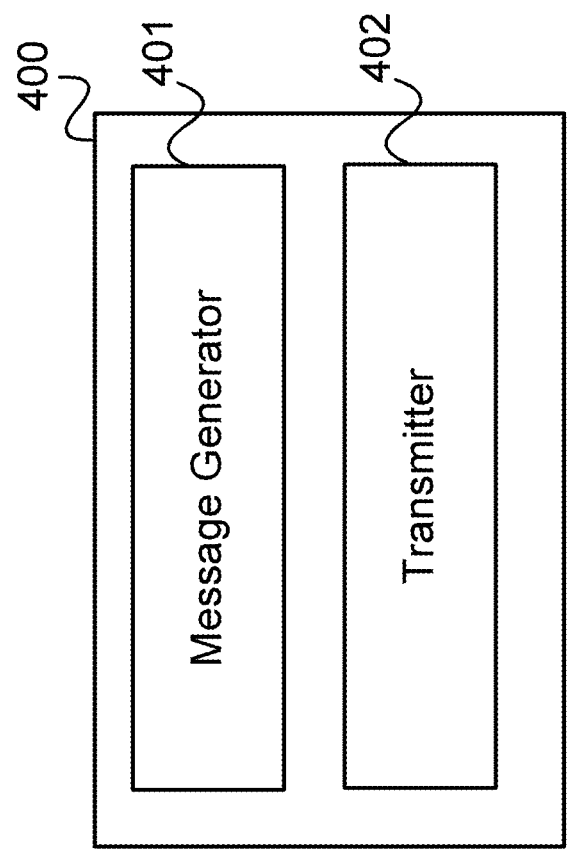
FIG. 4 shows a communication device requesting information.

FIG. 4 shows a communication device 400.

The communication device 400 includes 401 a message generator configured to generate a message indicating that a mobile terminal is to determine whether a transmitter of the mobile terminal has been active at a predetermined time and provide information which depends on the activity of the transmitter of the mobile terminal at the predetermined time.

The communication device further includes a transmitter 402 configured to transmit the message.

In other words, a communication device requests information from a mobile terminal which depends on the activity of a transmitter of the mobile terminal at a predetermined time, which may for example be indicated in the message or which may be predefined and known to the communication device and the mobile terminal.

For example, the communication device requests (and the communication terminal reports) information about polluted MDT measurements, i.e. measurement information which may be distorted by the activity of a transmitter (e.g. an ISM transmitter) of the mobile terminal. For example, the communication device is part of a communication network side and the information allows the network side (e.g. a eNB/TCE in case of LTE or a NB/RNC/TCE in case of UMTS) to make more qualified decisions about the current LTE DL reception quality.

Filtering of polluted measurements may be done in the communication terminal (i.e. the mobile terminal) or on the infrastructure side, e.g. by the communication device. The communication terminal may for example send a measurement pollution indicator to the communication device. For example, the mobile terminal may omit results of polluted measurement (i.e. filter the measurement results) or mark results of polluted measurements as being polluted. Accordingly, the message transmitted by the communication device may include an indication indicating that the mobile terminal is to omit results of polluted measurement (i.e. filter the measurement results) or mark results of polluted measurements as being polluted.

The message for example indicates that the mobile terminal is to provide information which is processed depending on the activity of the transmitter of the mobile terminal at the predetermined time. For example, the mobile terminal is to provide information which it has processed depending on the activity of the transmitter of the mobile terminal at the predetermined time (e.g. measurement results which are filtered depending on whether the transmitter has been active at the measurement time).

The information is for example the result of a measurement carried out by means of a receiver of the mobile terminal and the predetermined time is the time of the measurement.

For example, the message indicates that the mobile terminal is to determine whether the transmitter of the mobile terminal has potentially caused interference to the measurement and is to report the result of the measurement depending on the activity of the transmitter of the mobile terminal.

The receiver and the transmitter of the mobile terminal may for example use different radio technologies.

For example, the receiver is a cellular receiver module. For example, the receiver is operating according to LTE or LTE-Advanced cellular technology.

For example, the measurement is the measurement of a signal strength or a signal quality of a signal received by the receiver.

The information for example includes the information whether the transmitter of the mobile terminal has been active at the predetermined time.

The transmitter 402 is for example configured to transmit the message to one of a group of receiving entities consisting of
 a mobile terminal;
 a core network component (e.g. to be forwarded to the mobile terminal);
 a radio access network component (e.g. to be forwarded to the mobile terminal).

The transmitter of the mobile terminal is for example a short range communication transmitter.

The transmitter of the mobile terminal may for example be a transmitter operating in an unlicensed band.

For example, the transmitter of the mobile terminal is a transmitter operating in the ISM band.

The transmitter of the mobile terminal is for example a WLAN transmitter or a Bluetooth transmitter.

The message may for example indicate that the mobile terminal is to determine whether the transmitter of the mobile terminal or a further transmitter (e.g. a further WiFi or Bluetooth transceiver) of the mobile terminal have been active at a predetermined time and provide information which depends on the activity of the transmitter of the mobile terminal and the further transmitter of the mobile terminal at the predetermined time.

The communication device is for example part of a mobile communication network.

For example, the communication device is a core network (CN) node.

For example, the communication device is a radio access network (RAN) node.

For example, the communication device is a base station.

The message generator is for example configured to generate the message in accordance with Minimization of Drive Tests and the transmitter 402 is configured to transmit the message in accordance with Minimization of Drive Tests.

The communication device is for example part of the mobile communication network and the transmitter 402 is for example configured to transmit the message to another communication device of the mobile communication network.

Figure 5:
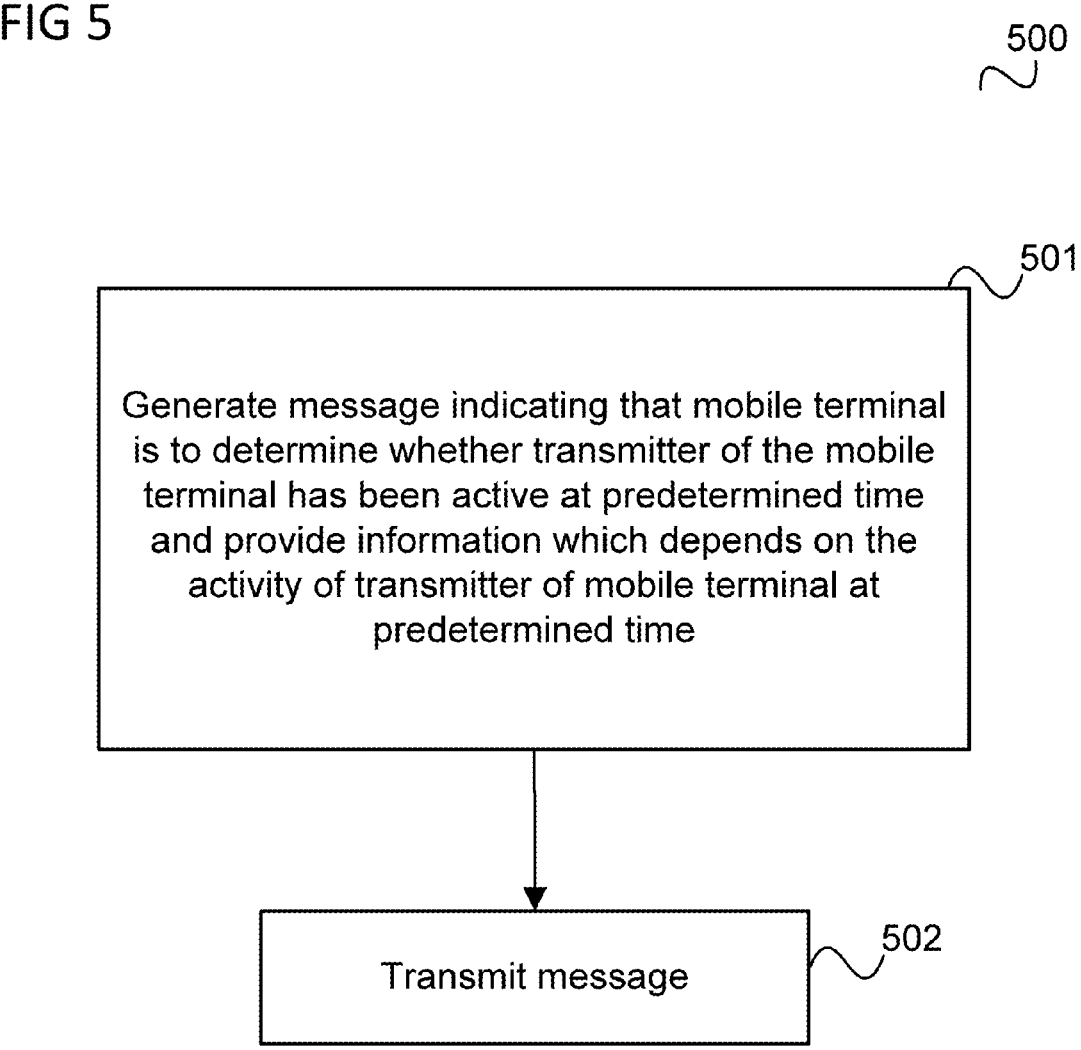
FIG. 5 shows a flow diagram illustrating a method for requesting information.

The communication device for example carries out a method as illustrated in FIG. 5.

FIG. 5 shows a flow diagram 500.

The flow diagram 500 illustrates a method for requesting information and is for example carried out by a communication device.

In 501, the communication device generates a message indicating that a mobile terminal is to determine whether a transmitter of the mobile terminal has been active at a predetermined time and provide information which depends on the activity of the transmitter of the mobile terminal at the predetermined time.

In 502, the communication device transmits the message.

For example, the communication device transmits the message to the mobile terminal. However, the communication device may also transmit the message within the mobile communication network, e.g. to another communication device that forwards the message to the mobile terminal.

Figure 6:
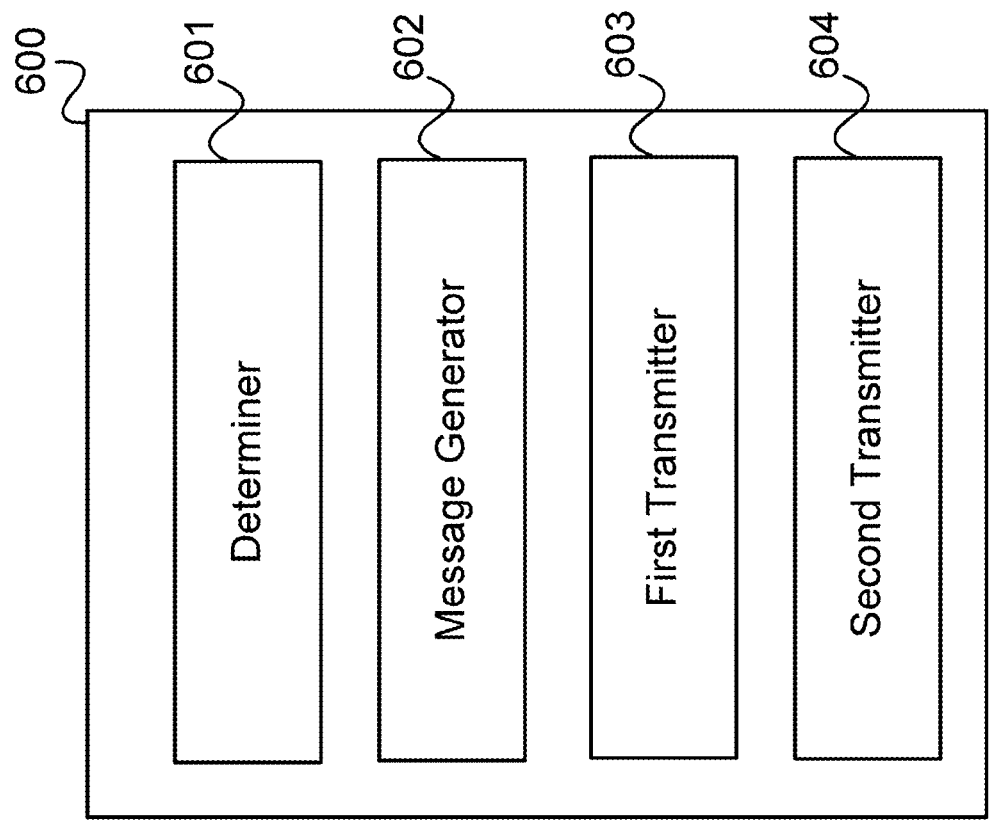
FIG. 6 shows a mobile terminal providing information.

The message is for example transmitted to the mobile terminal, e.g. to a mobile terminal as illustrated in FIG. 6.

FIG. 6 shows a mobile terminal 600.

The mobile terminal 600 includes a determiner 601 configured to determine whether a first transmitter 603 of the mobile terminal has been active at a predetermined time and a message generator 602 configured to generate a message including information which depends on the activity of the first transmitter 603 of the mobile terminal at the predetermined time.

Further, the mobile terminal 600 includes a second transmitter 604 configured to transmit the message.

The first transmitter 603 and the second transmitter 604 of the mobile terminal may for example use different radio technologies.

For example, the second transmitter 604 is a cellular transmitter module. For example, the second transmitter 604 is operating according to LTE or LTE-Advanced cellular technology.

Figure 7:
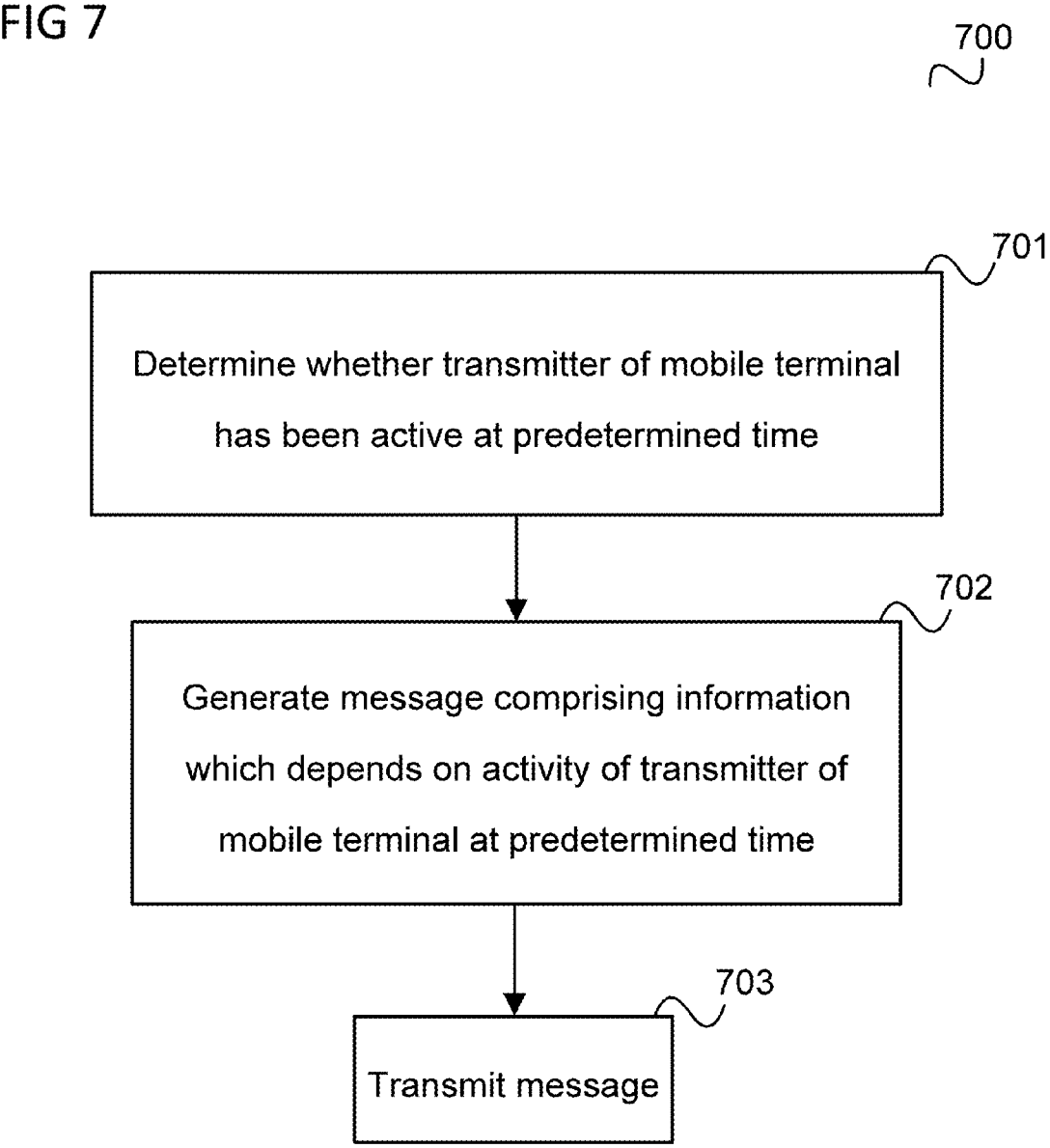
FIG. 7 shows a flow diagram illustrating a method for providing information.

The mobile terminal 700 for example carries out a method as illustrated in FIG. 7.

FIG. 7 shows a flow diagram 700.

The flow diagram 700 illustrates a method for providing information, for example carried out by a mobile terminal.

In 701, the mobile terminal determines whether a transmitter of the mobile terminal has been active at a predetermined time.

In 702, the mobile terminal generates a message including information which depends on the activity of the transmitter of the mobile terminal at the predetermined time.

In 703, the mobile terminal transmits the message.

The components of the communication device and/or the mobile terminal (e.g. the message generator, the various transmitters (i.e. the transmitter of the communication device and one or more transmitters of the mobile terminal), the receiver, the detector, the determiner etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

It should be noted that aspects regarding implementation of components described in context with the communication device 400 and the method illustrated in FIG. 5 are analogously valid for the mobile terminal 600 and the method illustrated in FIG. 7 and vice versa.

In the following examples for the communication device 400, the mobile terminal 500 and the corresponding methods are described in more detail.

Figure 8:
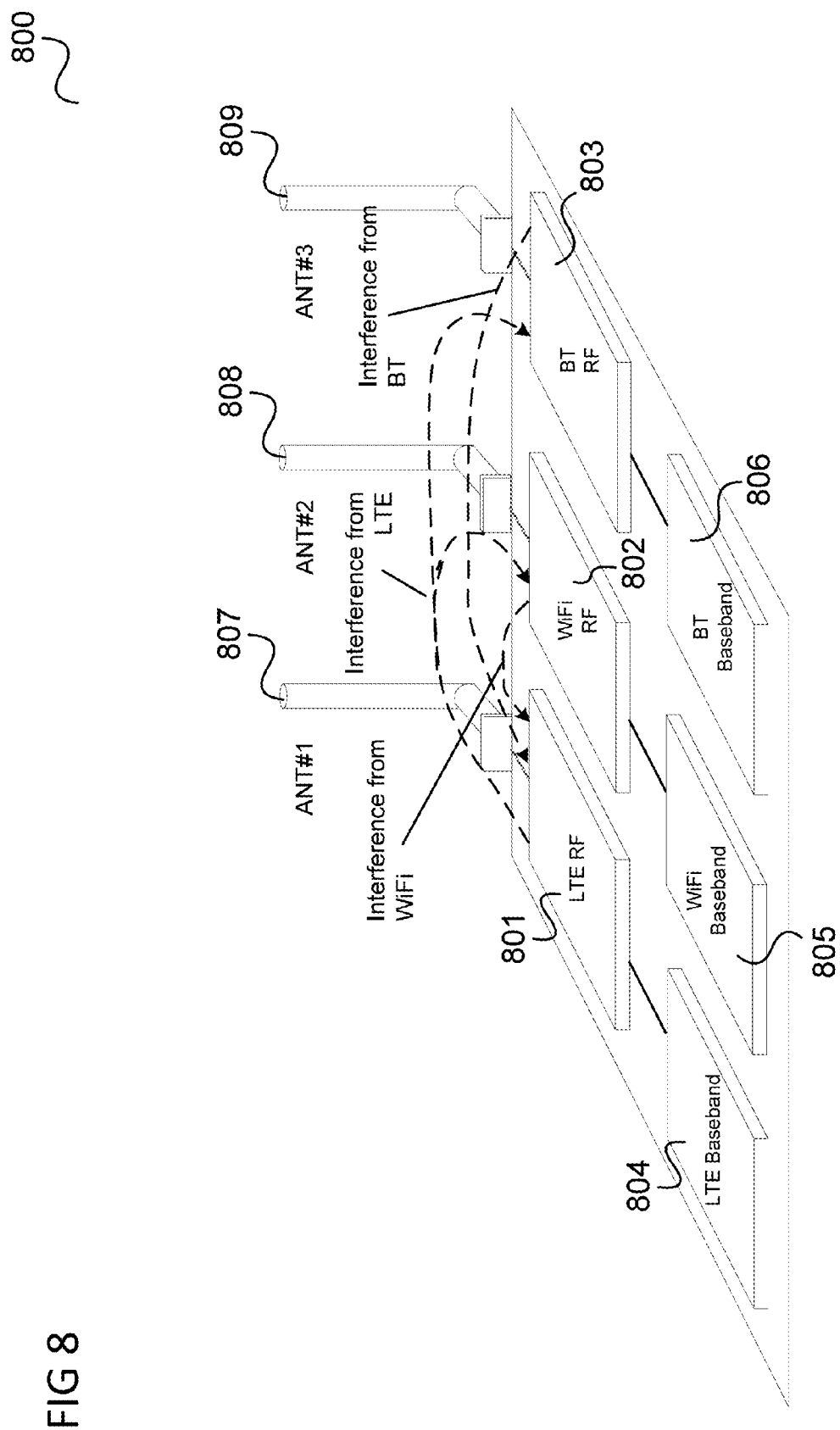
FIG. 8 shows a mobile terminal including a plurality of communication modules.

In the following example, the terminal is a UE, e.g. corresponding to the mobile terminal 105, which has, e.g. in order for its user to access various networks and services ubiquitously, multiple radio transceivers. This is illustrated in FIG. 8. For example, a transceiver may be a functional entity comprising both a transmitter and a receiver which are combined and share common circuitry or a single housing. In this description the term transceiver may also denote a functional entity comprising either a transmitter or a receiver. For instance, in case of GNSS (Global Navigation Satellite System), there is only one receiver in the mobile terminal 500 to receive GNSS signals from satellites. This GNSSS module is also termed transceiver in the following.

For example, a transceiver may be a functional entity comprising both an RF (radio frequency) part and a BB (base band) part. In this description the term transceiver may also describe a functional entity comprising either an RF (radio frequency) part, or a BB (base band) part.

FIG. 8 shows a mobile terminal 800.

In this example, the mobile terminal 800 is equipped with an LTE transceiver 801, a WiFi transceiver 802, and a Bluetooth transceiver 803. For each of these transceivers 801, 802, 803 the mobile terminal includes a baseband circuit 804, 805, 806 and an antenna 807, 808, 809. The mobile terminal 800 may include further transmitters/receivers, e.g. a GNSS receiver. It is desirable to avoid coexistence interference between the collocated radio transceivers 801, 802, 803.

Due to the proximity of the multiple radio transceivers 801, 802, 803 within the same UE 800, the transmit power of one transceiver 801, 802, 803 may be much higher than the received power level of another transceiver 801, 802, 803. By means of filter technologies and sufficient frequency separation, the transmit signal may not result in significant interference. But for some coexistence scenarios, e.g. different radio technologies within the same UE operating on adjacent frequencies, filter technology may not provide sufficient mitigation/rejection. Therefore, addressing the interference by single generic RF design may not always be possible.

Figure 9:
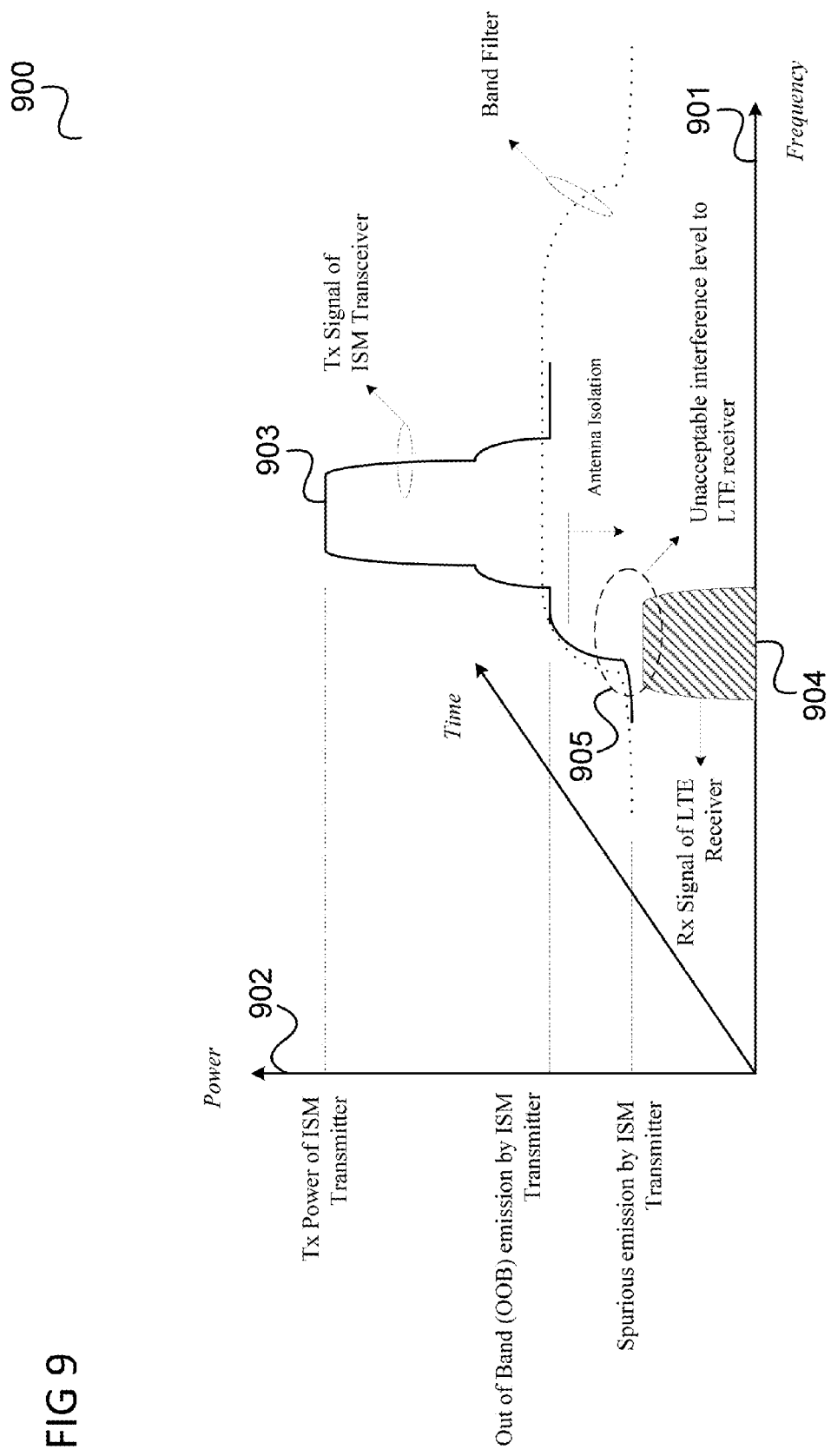
FIG. 9 shows a power diagram illustrating interference from ISM communication to LTE communication.

An example of interference of an ISM transmitter to an E-UTRA receiver is given in FIG. 9.

FIG. 9 shows a power diagram 900.

Frequency increases from left to right along a frequency axis 901 and power increases from bottom to top along a power axis 902.

A first graph 903 illustrates the transmission power of the ISM transceiver (e.g. of the transceiver that comprises the first transmitter of the mobile terminal, or a further transmitter of the mobile terminal 600, such as WiFi transceiver 802 or Bluetooth transceiver 803) in this example and a second graph 904 illustrates the power of the LTE downlink signal as received by the LTE transceiver 801. In this example, there is a region 905 of unacceptable level of ISM interference to the LTE transceiver 901.

Figure 10:
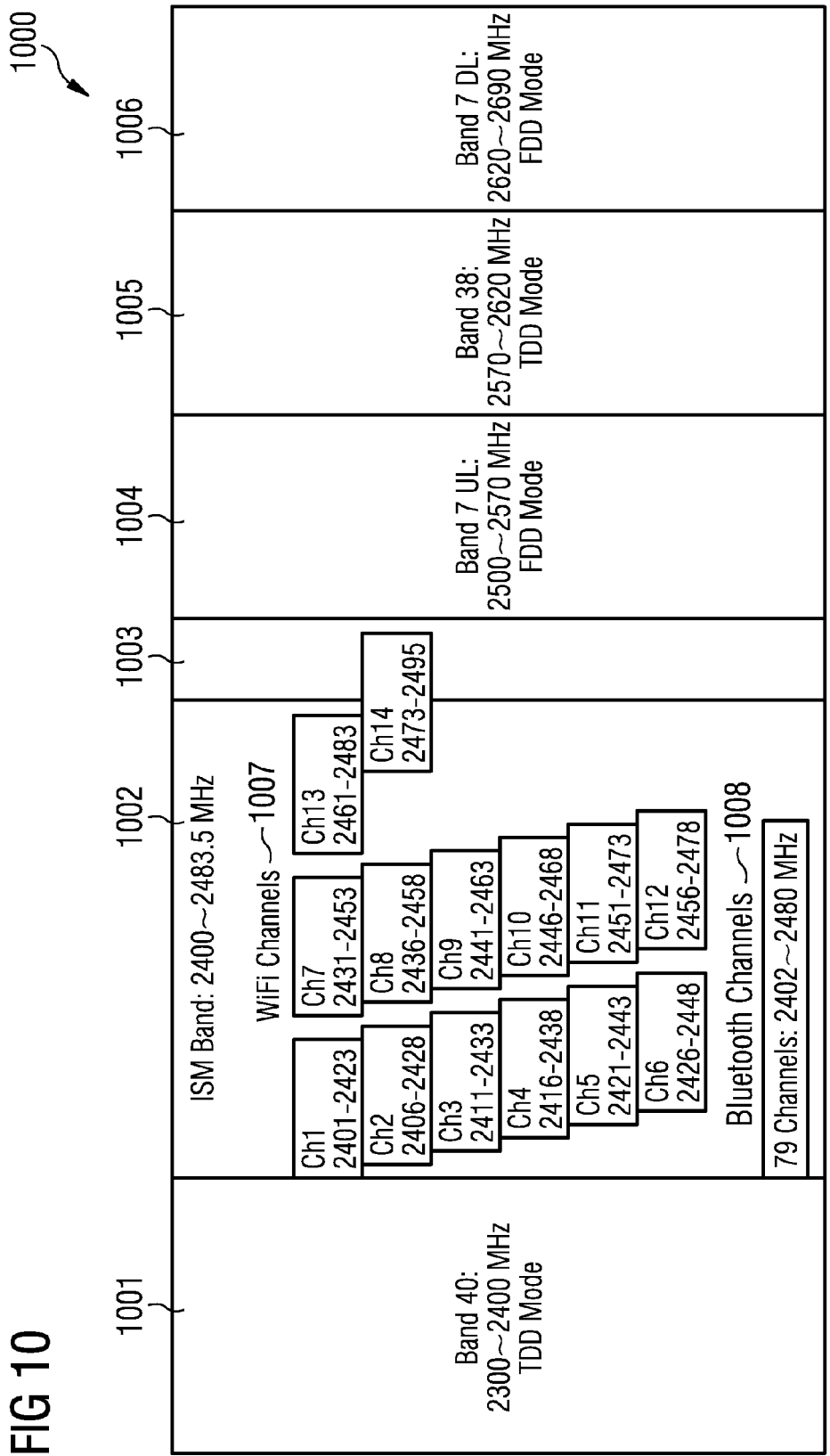
FIG. 10 shows a frequency band diagram illustrating the relation of LTE and ISM bands.

The relation of the 3GPP frequency bands used for LTE around the 2.4 GHz ISM band is illustrated in FIG. 10.

FIG. 10 shows a frequency diagram 1000.

In the frequency diagram 1000, at the lowest frequencies, there is 3GPP TDD band 40 1001. Adjacent thereto, there is the ISM band 1002 which is followed, after a frequency gap 1003, by 3GPP FDD band 7 uplink 1004, 3GPP TDD band 38 1005 and 3GPP FDD band 7 downlink 1006.

There are for example the following scenarios:
LTE coexisting with WiFi (WiFi channels 1007 within ISM band 1002)
There are 14 channels 1007 demarcated in ISM band for WiFi operation. Each channel 1007 has an offset of 5 MHz from the lower channel with an exception of channel number 14 where separation is 12 MHz. Channel 1 starts with 2401 MHz and channel 14 ends at 2495 MHz. Each WiFi channel can be uniquely identified by its channel number. Different countries have different policies with respect to the number of allowed channels of WiFi. Most of the countries allow only channel 1 to 13, while only in Japan the usage of channel number 14 is allowed for IEEE 802.11b. Transmissions in LTE band 40 will affect WiFi reception and vice-versa. Since band 7 is an FDD UL band there is no impact on the LTE receiver from the WiFi transmitter, but the WiFi receiver will be affected by the LTE UL transmitter.

LTE coexisting with Bluetooth (Bluetooth channels 1008 within ISM band 1002)

Bluetooth operates in 79 channels 1008 of 1 MHz each in ISM band. The first channel starts with 2402 MHz and the last channel ends at 2480 MHz. Each Bluetooth channel can be uniquely identified by its channel number. Similar as WiFi case, the activities of LTE band 40 and BT will disturb each other, and transmissions in LTE FDD UL band 7 will affect BT reception as well.

LTE Coexisting with GNSS

Examples of GNSS include GPS, Modernized GPS, Galileo, GLONASS, Space Based Augmentation Systems (SBAS), and Quasi Zenith Satellite System (QZSS). GNSS systems operate in various frequencies globally with country specific deviations. The problematic cases for collocated LTE and GNSS include:

Band 13 (UL: 777-787 MHz)/14 (UL: 788-798 MHz) can cause interference to L1/E1 frequency of GNSS (1575.42 MHz) as it is close to the second harmonics of band 13/14 (1554-1574 MHz for band 13, 1576-1596 MHz for band 14);

Galileo is supporting proposal for new global allocation at 2.5 GHz for GNSS, which will be affected by band 7 LTE collocated operation;

Indian Regional Navigation Satellite System uses IRNSS standard position and restricted services are transmitted on L5 (1164-1215 MHz) and S (2483.5-2500 MHz) bands, which will be affected by band 7 LTE collocated operation.

In summary, there are for example the following coexistence interference scenarios:

Case 1: LTE Band 40 radio Tx (transmission) causing interference to ISM radio Rx (reception);

Case 2: ISM radio Tx causing interference to LTE Band 40 radio Rx;

Case 3: LTE Band 7 radio Tx causing interference to ISM radio Rx;

Case 4: LTE Band 7/13/14 radio Tx causing interference to GNSS radio Rx.

In the following examples, the Trace-based MDT approach as described with reference to FIG. 3 is used. Configuration details (first from EM 301 to eNB 304, then from eNB 304 to UE 305), measurement details (in the UE 305), and reporting details (first from UE 305 to eNB 304, then from eNB 304 to the TCE 330) are discussed.

In this example, in the MDT configuration (first sent from EM 301 to eNB 304 and then from eNB 304 to UE 305) at least one parameter is added to turn on/off the "Pollution detection" feature. In detail, this (set of) new parameter(s) may be used to indicate to the UE 305 that the TCE 330 (which can be seen as MDT Server) is interested in details about ISM activity and possible interference this activity might cause on the LTE DL signals. Additionally, the TCE 330 may choose to request a single flag or a set of affected LTE DL frequencies. Additionally, thresholds values used to help determine whether a detected ISM interference signal is negligible or not may be part of the added at least one parameter.

Filtering of MDT measurements is for example performed either by the UE 305 or on the infrastructure side (i.e. by the eNB 304 in case of LTE, and by eNB/RNC in case of UMTS) when pollution of LTE DL signals has been detected.

In the trace-based MDT report first sent from UE 305 to eNB 304 and then from eNB 304 to TCE 330 at least one parameter is added for the "Pollution detection" results, i.e. the indication of pollution. This may for example be a single flag (one bit indicator) or a detailed description of affected LTE DL frequencies ("container").

The pollution detection of MDT measurements caused by ISM transmissions for example allows the following:

ISM pollution can be detected in LTE DL signals
 a. during MDT operation in LTE for LTE-UEs residing in
  i. RRC_CONNECTED
  ii. RRC_IDLE
 b. during MDT operation in UMTS for UMTS-UEs (if Inter-RAT measurements were activated) residing in
  i. Cell_DCH
  ii. Cell_PCH/URA_PCH/UTRA_Idle MDT measurement can be dropped, if they are polluted.

Wrong results due to ISM activity in the UE 305 forging MDT measurements can be avoided.

In the following, examples for one or more parameters which are included into the MDT configuration as it is exchanged on the network side (i.e. in 307, 309 and 311 in FIG. 3) are described in more detail.

According to the following examples, in the trace-based MDT configuration at least one parameter is used to control (e.g. turn on/off) the "ISM Detection" feature, i.e. to have the UE determine whether at the time of measurement a transmitter of the mobile terminal (e.g., an ISM transmitter) has been active and process the measurement results accordingly, e.g. filter out the results of possibly polluted measurements or mark the results of possibly polluted measurements.

In the following example, the trace session activation message sequence as described with reference to FIG. 3 is used for communicating this parameter to the UE 305. The at least one parameter is included (added) to the messages transmitted in 307, 309 and 311. Thus, the MDT configuration for ISM pollution detection measurements is propagated from the EM (Element Manager) 301 to the base station 304 in 307, 309 and 311. For 311 (between MME 303 and base station 304) the S1AP (S1 Application Protocol) may be modified in order to convey the MDT Configuration including the at least one parameter controlling the ISM pollution detection measurements.

Assistance data (such as threshold values) may be part of the MDT Configuration parameters. This is not shown in the tables below for the sake of brevity. Threshold values may be used to help determine whether a detected ISM interference signal is negligible or not (i.e. whether the received LTE DL signal is deemed polluted or not).

In 307, 309 and 311, the MDT Configuration IE (information element) may be used to transmit the MDT configuration details from the EM 301 to the base station 304. In the following three examples (alternatives) for possible modification of MDT Configuration IE are given to transmit one or more ISM pollution detection parameters from the EM 301 to the base station 304. It should be noted that a combination of the three alternatives given in the following may be used.

Alternative 1: The network side may turn on the pollution detection during MDT activation for all types of MDT measurements (i.e., feature is applicable to both immediate MDT and logged MDT).

Alternative 2: The network side may turn on the pollution detection feature during MDT activation independently for immediate MDT and/or logged MDT (i.e., feature is applicable to either immediate MDT or logged MDT or both)

Alternative 3: The network side may turn on the pollution detection feature for specific measurements for Immediate MDT Specific measurements may include the measurements M1, M2 etc. as defined according to 3GPP, e.g. RSRP and RSRQ measurements.

Further, the network may be able to request that the UE:

Option 1: identifies which measurements are suffering from ISM pollution.

Option 2: provides a detailed list of all affected frequencies that suffer from ISM activity.

Option 3: does not report a measurement to the network (or: excludes a particular measurement from reporting) if the measurement suffered from ISM pollution.

In the following, examples are shown on how to include the above alternatives and options using the messages according to 3GPP. The combination of above alternatives and options is possible and below a few possible combinations are shown. Likewise, usage of specific types are just exemplary (e.g., the BOOLEAN parameter can be complemented with the usage of the various ENUMERATED parameters in one or more additional "ISM Pollution Detection" parameters).

Example for Alternative #1

In this example as given by table 1, a global parameter is included to turn ISM Pollution Detection on and off (see line 3 of table 1).

TABLE 1

| | The IE defines the MDT configuration parameters. IE/Group Name | Presence | Range | IE type and reference | Semantics description |
|---|---|---|---|---|---|
| 1 | | | | | |
| 2 | MDT Activation | M | | ENUMERATED (Immediate MDT only, Logged MDT only, Immediate MDT and Trace, . . . ) | |
| 3 | >>ISM Pollution Detection | O | | BOOLEAN | Value "true" indicates "activate" and value "false" indicates "do not activate". |
| 4 | CHOICE Area Scope of MDT | M | | | |
| 5 | >Cell based | | | | |
| 6 | >>Cell ID List for MDT | | 1 to <maxnoofCellIDforMDT> | | |
| 7 | >>>E-CGI | M | | 9.2.1.38 | |
| 8 | >TA based | | | | |
| 9 | >>TA List for MDT | | 1 to <maxnoofTAforMDT> | | |
| 10 | >>>TAC | M | | 9.2.3.7 | |
| 11 | >PLMN Wide | | | NULL | |
| 12 | CHOICE MDT Mode | M | | | |
| 13 | >Immediate MDT | | | | |
| 14 | >>Measurements to Activate | M | | BITSTRING (SIZE(8)) | Each position in the bitmap indicates a MDT measurement. First Bit = M1, Second Bit = M2. Other bits are reserved for future use and are ignored if received. Value "1" indicates "activate" and value "0" indicates "do not activate". |

TABLE 1-continued

| IE/Group Name | Presence | Range | IE type and reference | Semantics description |
|---|---|---|---|---|
| The IE defines the MDT configuration parameters. | | | | |
| 15 >>Reporting Trigger MDT | M | | ENUMERATED (periodic, A2event-triggered,, . . . ) | |
| 16 >>Threshold Event A2 | C-ifM1A2trigger | | | Included in case of event-triggered reporting for measurement M1 |
| 17 >>>CHOICE Threshold | M | | | |
| 18 >>>>RSRP | | | | |
| 19 >>>>>Threshold RSRP | M | | INTEGER (0 . . . 97) | This IE is defined by 3GPP. |
| 20 >>>>RSRQ | | | | |
| 21 >>>>>Threshold RSRQ | M | | INTEGER (0 . . . 34) | This IE is defined by 3GPP. |
| 22 >>Periodic reporting MDT | C-ifperiodic MDT | | | Included in case of periodic reporting. |
| 23 >>>Report interval | M | | ENUMERATED (ms120, ms240, ms480, ms640, ms1024, ms2048, ms5120, ms10240,, min1, min6, min12, min30, min60) | This IE is defined by 3GPP. |
| 24 >>>Report amount | M | | ENUMERATED (1, 2, 4, 8, 16, 32, 64, infinity) | Number of reports. |
| 25 >Logged MDT | | | | |
| 26 >>Logging interval | M | | ENUMERATED (1.28, 2.56, 5.12, 10.24, 20.48, 30.72, 40.96 and 61.44) | This IE is defined by 3GPP. Unit: [second] |
| 27 >>Logging duration | M | | ENUMERATED (10, 20, 40, 60, 90 and 120) | This IE is defined by 3GPP. Unit: [minute] |

Example for Alternative #2

In this example, as given by table 2, a parameter for Immediate-MDT (line 14) and a parameter for Logged MDT (line 26) are included to turn ISM Pollution Detection on and off.

TABLE 2

| IE/Group Name | Presence | Range | IE type and reference | Semantics description |
|---|---|---|---|---|
| The IE defines the MDT configuration parameters. | | | | |
| 2 MDT Activation | M | | ENUMERATED (Immediate MDT only, Logged MDT only, | |

TABLE 2-continued

| | The IE defines the MDT configuration parameters. IE/Group Name | Presence | Range | IE type and reference | Semantics description |
|---|---|---|---|---|---|
| | | | | Immediate MDT and Trace, . . . ) | |
| 3 | CHOICE Area Scope of MDT | M | | | |
| 4 | >Cell based | | | | |
| 5 | >>Cell ID List for MDT | | 1 to <maxnoofCellIDforMDT> | | |
| 6 | >>>E-CGI | M | | 9.2.1.38 | |
| 7 | >TA based | | | | |
| 8 | >>TA List for MDT | | 1 to <maxnoofTAforMDT> | | |
| 9 | >>>TAC | M | | 9.2.3.7 | |
| 10 | >PLMN Wide | | | NULL | |
| 11 | CHOICE MDT Mode | M | | | |
| 12 | >Immediate MDT | | | | |
| 13 | >>Measurements to Activate | M | | BITSTRING (SIZE(8)) | Each position in the bitmap indicates a MDT measurement, as defined 3GPP. First Bit = M1, Second Bit = M2. Other bits are reserved for future use and are ignored if received. Value "1" indicates "activate" and value "0" indicates "do not activate". |
| 14 | >>ISM Pollution Detection | O | | ENUMERATED (flag, list) | Value "flag" indicates "please provide a flag, if pollution is detected" and value "list" indicates "please provide a detailed list of all affected LTE DL frequencies that suffer from ISM activity in the UE". |
| 15 | >>Reporting Trigger MDT | M | | ENUMERATED (periodic, A2event-triggered,, . . . ) | |

TABLE 2-continued

| 1 | The IE defines the MDT configuration parameters. IE/Group Name | Presence | Range | IE type and reference | Semantics description |
|---|---|---|---|---|---|
| 16 | >>Threshold Event A2 | C-ifM1A2trigger | | | Included in case of event-triggered reporting for measurement M1 |
| 17 | >>>CHOICE Threshold | M | | | |
| 18 | >>>>RSRP | | | | |
| 19 | >>>>>Threshold RSRP | M | | INTEGER (0 . . . 97) | This IE is defined by 3GPP. |
| 20 | >>>>RSRQ | | | | |
| 21 | >>>>>Threshold RSRQ | M | | INTEGER (0 . . . 34) | This IE is defined by 3GPP. |
| 22 | >>Periodic reporting MDT | C-ifperiodic MDT | | | Included in case of periodic reporting. |
| 23 | >>>Report interval | M | | ENUMERATED (ms120, ms240, ms480, ms640, ms1024, ms2048, ms5120, ms10240,, min1, min6, min12, min30, min60) | This IE is defined by 3GPP. |
| 24 | >>>Report amount | M | | ENUMERATED (1, 2, 4, 8, 16, 32, 64, infinity) | Number of reports. |
| 25 | >Logged MDT | | | | |
| 26 | >>ISM Pollution Detection | O | | ENUMERATED (tag, report, delete) | Value "tag" indicates "please tag all MDT measurements that are prone to ISM interference" and value "report" indicates "please provide a detailed list of all affected LTE DL frequencies that suffer from ISM activity in the UE" and the value "delete" indicates "please delete all measurements that are prone to ISM interference" |

TABLE 2-continued

| 1 | The IE defines the MDT configuration parameters. IE/Group Name | Presence | Range | IE type and reference | Semantics description |
|---|---|---|---|---|---|
| 27 | >>Logging interval | M | | ENUMERATED (1.28, 2.56, 5.12, 10.24, 20.48, 30.72, 40.96 and 61.44) | This IE is defined by 3GPP. Unit: [second] |
| 28 | >>Logging duration | M | | ENUMERATED (10, 20, 40, 60, 90 and 120) | This IE is defined by 3GPP. Unit: [minute] |

Example for Alternative #3

In this example, as given by table 3, a parameter is included for Immediate MDT to turn ISM Pollution Detection on and off for specific measurements (line 14). In addition, a parameter for Logged MDT is defined to turn ISM Pollution Detection on and off (line 26).

TABLE 3

| 1 | The IE defines the MDT configuration parameters. IE/Group Name | Presence | Range | IE type and reference | Semantics description |
|---|---|---|---|---|---|
| 2 | MDT Activation | M | | ENUMERATED (Immediate MDT only, Logged MDT only, Immediate MDT and Trace, . . . ) | |
| 3 | CHOICE Area Scope of MDT | M | | | |
| 4 | >Cell based | | | | |
| 5 | >>Cell ID List for MDT | | 1 to <maxnoof CellIDfor MDT> | | |
| 6 | >>>E-CGI | M | | 9.2.1.38 | |
| 7 | >TA based | | | | |
| 8 | >>TA List for MDT | | 1 to <maxnoof TAforMDT> | | |
| 9 | >>>TAC | M | | 9.2.3.7 | |
| 10 | >PLMN Wide | | | NULL | |
| 11 | CHOICE MDT Mode | M | | | |
| 12 | >Immediate MDT | | | | |
| 13 | >>Measurements to Activate | M | | BITSTRING (SIZE(8)) | Each position in the bitmap indicates a MDT measurement, as defined in by 3GPP. First Bit = M1, Second Bit = M2. Other bits are reserved for future use and are ignored if received. |

TABLE 3-continued

| 1 | The IE defines the MDT configuration parameters. IE/Group Name | Presence | Range | IE type and reference | Semantics description |
|---|---|---|---|---|---|
| 14 | >>ISM Pollution Detection | O | | BITSTRING (SIZE(8)) | Value "1" indicates "activate" and value "0" indicates "do not activate". Each position in the bitmap indicates a MDT measurement, as defined in TS 37.320 First Bit = M1, Second Bit = M2, etc. Other bits are reserved for future use and are ignored if received. Value "1" indicates "activate ISM Pollution Detection feature" and value "0" indicates "do not activate ISM Pollution Detection Feature". |
| 15 | >>Reporting Trigger MDT | M | | ENUMERATED (periodic, A2event-triggered,, ...) | |
| 16 | >>Threshold Event A2 | C-ifM1A2trigger | | | Included in case of event-triggered reporting for measurement M1 |
| 17 | >>>CHOICE Threshold | M | | | |
| 18 | >>>>RSRP | | | | |
| 19 | >>>>>Threshold RSRP | M | | INTEGER (0 ... 97) | This IE is defined by 3GPP. |
| 20 | >>>>RSRQ | | | | |
| 21 | >>>>>Threshold RSRQ | M | | INTEGER (0 ... 34) | This IE is defined by 3GPP. |
| 22 | >>Periodic reporting MDT | C-ifperiodicMDT | | | Included in case of periodic reporting. |
| 23 | >>>Report interval | M | | ENUMERATED (ms120, ms240, ms480, ms640, ms1024, ms2048, ms5120, ms10240,, | This IE is defined by 3GPP. |

TABLE 3-continued

| 1 | The IE defines the MDT configuration parameters. IE/Group Name | Presence | Range | IE type and reference | Semantics description |
|---|---|---|---|---|---|
| 24 | >>>Report amount | M | | min1, min6, min12, min30, min60) ENUMERATED (1, 2, 4, 8, 16, 32, 64, infinity) | Number of reports. |
| 25 | >Logged MDT | | | | |
| 26 | >>ISM Pollution Detection | O | | ENUMERATED (tag, report, delete) | Value "tag" indicates "please tag all MDT measurements that are prone to ISM interference" and value "report" indicates "please provide a detailed list of all affected LTE DL frequencies that suffer from ISM activity in the UE" and the value "delete" indicates "please delete all measurements that are prone to ISM interference" |
| 27 | >>Logging interval | M | | ENUMERATED (1.28, 2.56, 5.12, 10.24, 20.48, 30.72, 40.96 and 61.44) | This IE is defined by 3GPP. Unit: [second] |
| 28 | >>Logging duration | M | | ENUMERATED (10, 20, 40, 60, 90 and 120) | This IE is defined by 3GPP. Unit: [minute] |

In the following, examples for using RRC signaling over the air interface to convey the ISM pollution detection measurement configuration from the base station 304 to the mobile terminal 305 are described. In the following examples, a RRC Connection Reconfiguration is used to configure and reconfigure ISM pollution detection measurements in Immediate-MDT for a UE in RRC_CONNECTED and a Logged Measurement Configuration message is used to configure ISM pollution detection measurements in Logged-MDT for a UE in RRC_IDLE.

A RRC Connection Reconfiguration message is typically used to modify an RRC connection, e.g. to establish/modify/release radio bearers, to perform handover, or to setup/modify/release measurements. As part of the procedure, NAS (Non-Access Stratum) dedicated information may be transferred from the E-UTRAN 101 to the UE 105. A RRC Connection Reconfiguration message as described in the following is for example transmitted in 315, wherein it is assumed for this example that the UE 305 is in RRC_CONNECTED during 315, 316, 317, 318, and 319. Further, after 318, before reporting to the base station 304 in 319, the UE 305 may tag the MDT measurements with an ISM pollution flag or delete the MDT measurements which are prone to interference depending on the option used.

In the following, a possible modification of the RRC Connection Reconfiguration message is described for conveying ISM pollution detection measurement configuration information, in this example using the measConfig IE of the RRC Connection Reconfiguration which specifies the measurements to be performed by the UE and covers intra-frequency, inter-frequency and inter-RAT mobility as well as configuration of measurement gaps.

In this example, the relevant IE inside the measConfig IE is the ReportConfigToAddModList IE and the relevant IE inside the ReportConfigToAddModList IE is the ReportConfigEUTRA IE. It is shown in table 4.

TABLE 4

| ReportConfigEUTRA |
|---|

```
1   -- ASN1START
2
3   ReportConfigEUTRA ::=              SEQUENCE {
4       triggerType                        CHOICE {
5           event                              SEQUENCE {
6               eventId                            CHOICE {
7                   eventA1                            SEQUENCE {
8                       a1-Threshold                       ThresholdEUTRA
9                   },
10                  eventA2                            SEQUENCE {
11                      a2-Threshold                       ThresholdEUTRA
12                  },
13                  eventA3                            SEQUENCE {
14                      a3-Offset                          INTEGER (-30..30),
15                      reportOnLeave                      BOOLEAN
16                  },
17                  eventA4                            SEQUENCE {
18                      a4-Threshold                       ThresholdEUTRA
19                  },
20                  eventA5                            SEQUENCE {
21                      a5-Threshold1                      ThresholdEUTRA,
22                      a5-Threshold2                      ThresholdEUTRA
23                  },
24                  ...,
25                  eventA6-r10                        SEQUENCE {
26                      a6-Offset-r10                      INTEGER (-30..30),
27                      a6-ReportOnLeave-r10               BOOLEAN
28                  }
29              },
30              hysteresis                         Hysteresis,
31              timeToTrigger                      TimeToTrigger
32          },
33          periodical                         SEQUENCE {
34              purpose                            ENUMERATED {
35                                                     reportStrongestCells,
    reportCGI}
36          }
37      },
38      triggerQuantity                    ENUMERATED {rsrp, rsrq},
39      reportQuantity                     ENUMERATED {sameAsTriggerQuantity,
    both},
40      maxReportCells                     INTEGER (1..maxCellReport),
41      reportInterval                   ReportInterval,
42      reportAmount                       ENUMERATED {r1, r2, r4, r8, r16, r32,
    r64, infinity},
43      ISM-InterferenceDetectionConfig       (the encoding options are discussed
    below)
44      ...,
45      [[ si-RequestForHO-r9              ENUMERATED {setup}
        OPTIONAL, -- Cond reportCGI
46          ue-RxTxTimeDiffPeriodical-r9   ENUMERATED {setup}
        OPTIONAL -- Need OR
47      ]],
48      [[ includeLocationInfo-r10         ENUMERATED {true}
        OPTIONAL, -- Need OR
49          reportAddNeighMeas-r10         ENUMERATED {setup}
        OPTIONAL -- Need OR
50      ]]
51  }
52
53  ThresholdEUTRA ::=                 CHOICE {
54      hreshold-RSRP                      RSRP-Range,
55      threshold-RSRQ                     RSRQ-Range
56  }
57
58  -- ASN1STOP
```

In this example, ISM interference detection configuration has been added in line 43. Options for its encoding are given below.

The Logged Measurement Configuration RRC message is typically used by E-UTRAN 101 to configure the UE 105 to perform logging of measurement results while it is in RRC_IDLE.

A Logged Measurement Configuration RRC message as described in the following is for example transmitted in 315, wherein it is assumed for this example that the UE 305 is in RRC_CONNECTED during 315, 317 and 318. 316 is omitted in this case. Further, after 318, before reporting to the base station 304 in 319, the UE 305 may tag the MDT measurements with an ISM pollution flag or delete the MDT measurements which are prone to interference depending on the option used.

For transferring the logged MDT ISM pollution detection measurement configuration, the Logged Measurement Configuration RRC message for example has the structure as shown in table 5, wherein the entry in line 30 has been added for ISM pollution detection measurement parameters. It is transmitted by SRB1 (SRB: Signaling Radio Bearer) via the logical channel DCCH with the AM (Acknowledged Mode) RLC-SAP (Radio Link Control-Service Access Point).

1) The ISM-InterferenceDetectionConfig IE is specified as a BOOLEAN variable that can be used to turn ISM Interference Detection on and off.
2) The ISM-InterferenceDetectionConfig IE is specified as an ENUMERATED variable with possible values of "flag" and "list": If "flag" is present then the MDT measurement results are tagged with an "ISM interference" label if ISM interference was detected in the UE while MDT measurements were taken. If "list" is present then the UE provides a detailed listing of LTE DL frequencies that were prone to ISM interference while the MDT measurements were taken.
3) The ISM-InterferenceDetectionConfig IE is specified as an ENUMERATED variable with possible values of "tag", "report" and "delete": If "tag" is present then all MDT measurements that are prone to ISM interference are tagged by the UE. If "report" is present then all LTE DL frequencies suffering from ISM interference problems are reported as part the MDT measurement results. In these two cases the infrastructure side (eNB/RNC) may be responsible for filtering of MDT measurement results that were prone to ISM interference. If "delete" is present then all MDT measurement results that were forged by ISM interference are deleted from the MDT measurement results before these are conveyed to the

TABLE 5

```
1   -- ASN1START
2
3   LoggedMeasurementConfiguration-r10 ::= SEQUENCE {
4       criticalExtensions                  CHOICE {
5           c1                              CHOICE {
6               loggedMeasurementConfiguration-r10
            LoggedMeasurementConfiguration-r10-IEs,
7               spare3 NULL, spare2 NULL, spare1 NULL
8           },
9           criticalExtensionsFuture        SEQUENCE { }
10      }
11  }
12
13
14  LoggedMeasurementConfiguration-r10-IEs ::= SEQUENCE {
15      traceReference-r10              TraceReference-r10,
16      traceRecordingSessionRef-r10    OCTET STRING (SIZE (2)),
17      tce-Id-r10                      OCTET STRING (SIZE (1)),
18      absoluteTimeInfo-r10            AbsoluteTimeInfo-r10,
19      areaConfiguration-r10           AreaConfiguration-r10     OPTIONAL, --
    Need OR
20      loggingDuration-r10             LoggingDuration-r10,
21      loggingInterval-r10             LoggingInterval-r10,
22      nonCriticalExtension            LoggedMeasurementConfiguration-v11x0-IEs
        OPTIONAL
23  }
24
25  LoggedMeasurementConfiguration-v11x0-IEs ::= SEQUENCE {
26      lateNonCriticalExtension        OCTET STRING              OPTIONAL,
        -- Need OP
27      plmn-IdentityList-r11           PLMN-IdentityList3-r11    OPTIONAL,
        -- Need OP
28      areaConfiguration-v11x0             AreaConfiguration-v11x0
        OPTIONAL, -- Need OR
29      nonCriticalExtension            SEQUENCE { }
        OPTIONAL -- Need OP
30      ISM-InterferenceDetectionConfig       (the encoding options are discussed
    below)
31  }
32
33  -- ASN1STOP
```

In the following, possible exemplary options for the possible format of the ISM-InterferenceDetectionConfig entry are given.

infrastructure, i.e. the UE is responsible for filtering of MDT measurement results that are prone to ISM interference.

4) The ISM-InterferenceDetectionConfig IE is specified as an ENUMERATED variable with possible values of "normal", "RLF" and "CEF": If "RLF" is present then the UE detects and/or report the impact of ISM interference on the LTE DL frequencies when a radio link failure (RLF) occurs. If "CEF" is present then the UE detects and/or report the impact of ISM interference on the LTE DL frequencies when Connection Establishment Failure (CEF) occurs. When "normal" is present, the UE for example detects and/or reports the impact of ISM interference periodically.

5) The ISM-InterferenceDetectionConfig IE is specified as an ENUMERATED variable containing the list of specific measurements that the UE should detect and/or report the impact of ISM interference, e.g. M1, M2, . . . , M6 on according to 3GPP and optionally additional measurements.

In the following, the reporting by the UE 305 back to the network side is described.

For reporting, the UE 305 may for example use one of the following alternatives, e.g. depending on how the UE 305 was configured for pollution detection:

1) The UE notifies the network (via the base station 304) that the UE detected ISM interference while MDT measurements took place. In this case it is the responsibility of the network to filter MDT measurements that are affected by ISM interference.

2) The UE deletes the measurements that were prone to ISM interference during the MDT measurements process. In this case it is the responsibility of the UE to filter MDT measurements that are affected by ISM interference. The UE may choose to inform the network about this filtering in the UE.

3) The UE reports the measurements and together with the reporting it indicates how severe the ISM interference was. This severeness could for instance be defined as none, light, medium, high (or more levels could be created). Optionally, SIR (signal to interference ratio) may be provided, if available. Said reporting may be done per ARFCN (Absolute Radio Frequency Channel Number).

4) The UE reports the measurements and together with the reporting it indicates the ISM channel identifiers of the ISM channels (e.g., channel numbers) that contributed to the interference or simply the amount of ISM channels (WiFi channels and/or Bluetooth channels) that contributed to the interference.

For determining whether the detected in-device interference (e.g., caused by WiFi or Bluetooth) is negligible or not (i.e. whether (a portion of) an LTE DL signal can be deemed "polluted" or not/whether measurements have to be deleted or not) assistance data (such as threshold values) received upon MDT configuration may be used by the UE.

For example, RRC signaling over the air interface 106 is used to convey the ISM pollution detection measurement results from the mobile terminal 105 back to the eNB 103. The affected RRC messages for this are:

Measurement Report RRC message
It is used for the transport of Immediate-MDT measurement results for UEs in RRC_CONNECTED,
It may be sent from UE to eNodeB periodically or event triggered,
It is for example transmitted in 319 from the UE 305 to the base station 304.

UE Information Response RRC Message
It is used for the transport of Logged-MDT measurement results after the respective UE has returned back to RRC_CONNECTED,
It is sent from the UE to the eNodeB upon network request,
It is for example transmitted in 319 from the UE 305 to the base station 304, e.g. in response to a UE Information Request transmitted from the base station 304 to the UE 305.

The Measurement Report RRC message is generally used for the indication of measurement results. The relevant IE inside the Measurement Report RRC message is the measResults IE, which covers measured results for intra-frequency, inter-frequency and inter-RAT mobility.

An example for the measResults IE is given in table 6, wherein the elements in line 8 (for the serving cell), line 37 (for inter-frequency cells), lines 51 (for the SCcells) and 57 (for the SCell best neighbors) have been added for the reporting of ISM pollution detection measurements.

TABLE 6

```
1   -- ASN1START
2
3   MeasResults ::=                         SEQUENCE {
4       measId                              MeasId,
5       measResultPCell                     SEQUENCE {
6           rsrpResult                          RSRP-Range,
7           rsrqResult                          RSRQ-Range
8           ISM-InterferenceIndication          (the encoding options are discussed below)
9       },
10      measResultNeighCells                CHOICE {
11          measResultListEUTRA                 MeasResultListEUTRA,
12          measResultListUTRA                  MeasResultListUTRA,
13          measResultListGERAN                 MeasResultListGERAN,
14          measResultsCDMA2000                 MeasResultsCDMA2000,
15          ...
16      }
        OPTIONAL,
17      ...,
18      [[ measResultForECID-r9              MeasResultForECID-r9
        OPTIONAL
19      ]],
20      [[ locationInfo-r10                  LocationInfo-r10
        OPTIONAL,
21          measResultServFreqList-r10          MeasResultServFreqList-r10
        OPTIONAL
22      ]]
```

TABLE 6-continued

```
23    }
24
25    MeasResultListEUTRA ::=              SEQUENCE (SIZE (1..maxCellReport))
      OF MeasResultEUTRA
26
27    MeasResultEUTRA ::= SEQUENCE {
28        physCellId                       PhysCellId,
29        cgi-Info                         SEQUENCE {
30            cellGlobalId                 CellGlobalIdEUTRA,
31            trackingAreaCode             TrackingAreaCode,
32            plmn-IdentityList            PLMN-IdentityList2
          OPTIONAL
33        }                                OPTIONAL,
34        measResult                       SEQUENCE {
35            rsrpResult                   RSRP-Range
          OPTIONAL,
36            rsrqResult                   RSRQ-Range
          OPTIONAL,
37            ISM-InterferenceIndication        (the encoding options are discussed
      below)
38            ...,
39            [[ additionalSI-Info-r9           AdditionalSI-Info-r9
          OPTIONAL
40            ]]
41        }
42    }
43
44    MeasResultServFreqList-r10 ::=       SEQUENCE (SIZE (1..maxServCell-r10)) OF
      MeasResultServFreq-r10
45
46    MeasResultServFreq-r10 ::=           SEQUENCE {
47        servFreqId-r10                   ServCellIndex-r10,
48        measResultSCell-r10                   SEQUENCE {
49            rsrpResultSCell-r10          RSRP-Range,
50            rsrqResultSCell-r10          RSRQ-Range
51            ISM-InterferenceIndication        (the encoding options are discussed
      below)
52        }                                     OPTIONAL,
53        measResultBestNeighCell-r10           SEQUENCE {
54            physCellId-r10                    PhysCellId,
55            rsrpResultNCell-r10               RSRP-Range,
56            rsrqResultNCell-r10               RSRQ-Range
57            ISM-InterferenceIndication        (the encoding options are discussed
      below)
58        }                                     OPTIONAL,
59        ...
60    }
61
62    MeasResultListUTRA ::=               SEQUENCE (SIZE (1..maxCellReport))
      OF MeasResultUTRA
63
64    MeasResultUTRA ::= SEQUENCE {
65        physCellId                       CHOICE {
66            fdd                          PhysCellIdUTRA-FDD,
67            tdd                          PhysCellIdUTRA-TDD
68        },
69        cgi-Info                         SEQUENCE {
70            cellGlobalId                 CellGlobalIdUTRA,
71            locationAreaCode             BIT STRING (SIZE (16))
          OPTIONAL,
72            routingAreaCode              BIT STRING (SIZE (8))
          OPTIONAL,
73            plmn-IdentityList            PLMN-IdentityList2
          OPTIONAL
74        }                                OPTIONAL,
75        measResult                       SEQUENCE {
76            utra-RSCP                    INTEGER (-5..91)
          OPTIONAL,
77            utra-EcN0                    INTEGER (0..49)
          OPTIONAL,
78            ...,
79            [[ additionalSI-Info-r9           AdditionalSI-Info-r9
          OPTIONAL
80            ]]
81        }
```

TABLE 6-continued

```
82       }
83
84       MeasResultListGERAN ::=             SEQUENCE (SIZE (1..maxCellReport))
         OF MeasResultGERAN
85
86       MeasResultGERAN ::= SEQUENCE {
87           carrierFreq                     CarrierFreqGERAN,
88           physCellId                      PhysCellIdGERAN,
89           cgi-Info                        SEQUENCE {
90               cellGlobalId                    CellGlobalIdGERAN,
91               routingAreaCode                 BIT STRING (SIZE (8))
             OPTIONAL
92           }
         OPTIONAL,
93           measResult                      SEQUENCE {
94               rssi                            INTEGER (0..63),
95               ...
96           }
97       }
98
99       MeasResultsCDMA2000 ::=             SEQUENCE {
100          preRegistrationStatusHRPD           BOOLEAN,
101          measResultListCDMA2000              MeasResultListCDMA2000
102      }
103
104      MeasResultListCDMA2000 ::=          SEQUENCE (SIZE (1..maxCellReport))
         OF MeasResultCDMA2000
105
106      MeasResultCDMA2000 ::= SEQUENCE {
107          physCellId                      PhysCellIdCDMA2000,
108          cgi-Info                        CellGlobalIdCDMA2000
         OPTIONAL,
109          measResult                      SEQUENCE {
110              pilotPnPhase                    INTEGER (0..32767)
             OPTIONAL,
111              pilotStrength                   INTEGER (0..63),
112              ...
113          }
114      }
115
116      MeasResultForECID-r9 ::=            SEQUENCE {
117          ue-RxTxTimeDiffResult-r9            INTEGER (0..4095),
118          currentSFN-r9                       BIT STRING (SIZE (10))
119      }
120
121      PLMN-IdentityList2 ::=              SEQUENCE (SIZE (1..5)) OF PLMN-
         Identity
122
123      AdditionalSI-Info-r9 ::=            SEQUENCE {
124          csg-MemberStatus-r9                 ENUMERATED {member}
         OPTIONAL,
125          csg-Identity-r9                     CSG-Identity
         OPTIONAL
126      }
127
128      -- ASN1STOP
```

In the following, possible exemplary options for the possible format of the ISM-InterferenceIndication entry are given.

1) The ISM-InterferenceIndication IE is specified as a BOOLEAN variable that is set to "true" when the UE detected ISM interference (while MDT measurements took place).

2) The ISM-InterferenceIndication IE is specified as an ENUMERATED variable with possible values of "tagged" and "deleted": With "tagged" the infrastructure (i.e. the network side) can be informed about that fact that "ISM interference" took place in the UE while MDT measurements were collected. In this case the infrastructure side (eNB/RNC) may be responsible for filtering of MDT measurement results that were prone to ISM interference and may use this tag. If "deleted" is present then the UE has autonomously deleted some MDT measurements from the MDT measurement results (namely those measurements that were prone to ISM interference during the MDT measurements process). In this case the UE is responsible for filtering of MDT measurement results that are prone to ISM interference.

3) The ISM-InterferenceIndication IE is specified as a record with up to max entries (containers) according to

```
ISM-InterferenceIndication      SEQUENCE (SIZE (1..max)) OF ISM-
InterferenceContainer
ISM-InterferenceContainer       SEQUENCE {
Container-Identifier                INTEGER (1..max),
Frequency                           ARFCN-ValueEUTRA,
Severeness                          ENUMERATED (none, light, medium,
heavy)
}
```

Each container may describe the level of severeness of ISM interference per ARFCN (Absolute Radio Frequency Channel Number). In this example, the interference on LTE caused by ISM can be expressed.

4) The ISM-InterferenceIndication IE is specified as a record with up to max entries (containers) according to 4a)

| | |
|---|---|
| ISM-InterferenceIndication | SEQUENCE (SIZE (1..max)) OF ISM-InterferenceContainer |
| ISM-InterferenceContainer | SEQUENCE { |
| Container-Identifier | INTEGER (1..max), |
| WiFi-Channel | ENUMERATED (1, 2, 3, ..., 14), |
| Bluetooth-Channel | ENUMERATED (1, 2, 3, ..., 79), |
| LTE-Band | ENUMERATED (40, 7), |
| InterferedTechnology | ENUMERATED (LTE, BT, WiFi, GPS) |
| InterferingTechnology | ENUMERATED (LTE, BT, WiFi, GPS) |
| } | |

Each container may list the identifiers of WiFi channels and/or Bluetooth channels that are affected by in-device interference in the UE caused by LTE signals, or that interfere with LTE signals.

In this example, the interference on LTE bands caused by ISM can be expressed as well as the interference on ISM channels caused by LTE.

The WiFi and the Bluetooth channel may also be indicated separately, e.g. according to 4b)

| | |
|---|---|
| ISM-InterferenceIndication | SEQUENCE (SIZE (1..max)) OF ISM-InterferenceContainer |
| ISM-InterferenceContainer | SEQUENCE { |
| Container-Identifier | INTEGER (1..max), |
| ISM-Channel | CHOICE { |
| WiFi-Channel | ENUMERATED (1, 2, 3, ..., 14), |
| Bluetooth-Channel | ENUMERATED (1, 2, 3, ..., 79) |
| } | |
| } | |

In this example, the interference on ISM channels caused by LTE can be expressed.

The UEInformationResponse message for example has a structure as shown in table 7. It is transmitted via the logical channel DCCH with the AM RLC-SAP over SRB2 (when logged measurement information is included) or SRB1. The elements in line 42 (for Radio Link Failure in the Serving Cell), line 112 (for the serving cell) and line 131 (for Connection Establishment Failure in the serving cell) have been included for the reporting of ISM pollution detection measurements.

TABLE 7

```
1   -- ASN1START
2
3   UEInformationResponse-r9 ::=              SEQUENCE {
4       rrc-TransactionIdentifier                 RRC-TransactionIdentifier,
5       criticalExtensions                        CHOICE {
6           c1                                        CHOICE {
7               ueInformationResponse-r9                  UEInformationResponse-r9-IEs,
8               spare3 NULL, spare2 NULL, spare1 NULL
9           },
10          criticalExtensionsFuture                  SEQUENCE { }
11      }
12  }
13
14  UEInformationResponse-r9-IEs ::=          SEQUENCE {
15      rach-Report-r9                            SEQUENCE {
16          numberOfPreamblesSent-r9                  INTEGER (1..200),
17          contentionDetected-r9                     BOOLEAN
18      }                                                                   OPTIONAL,
19      rlf-Report-r9                             RLF-Report-r9    OPTIONAL,
20      nonCriticalExtension                      UEInformationResponse-v930-IEs
21  }
22
23  UEInformationResponse-v930-IEs ::=        SEQUENCE {
24      lateNonCriticalExtension                  OCTET STRING
        OPTIONAL,
25      nonCriticalExtension                      UEInformationResponse-v1020-IEs
        OPTIONAL
26  }
27
28  UEInformationResponse-v1020-IEs ::=       SEQUENCE {
29      logMeasReport-r10                         LogMeasReport-r10
        OPTIONAL,
30      nonCriticalExtension                      UEInformationResponse-v11x0-IEs
        OPTIONAL
31  }
32
33  UEInformationResponse-v11x0-IEs ::= SEQUENCE {
34      connEstFailReport-r11                     ConnEstFailReport-r11
        OPTIONAL,
35      nonCriticalExtension                      SEQUENCE { }
        OPTIONAL
36  }
37
38  RLF-Report-r9 ::=                         SEQUENCE {
39      measResultLastServCell-r9                 SEQUENCE {
40          rsrpResult-r9                             RSRP-Range,
```

TABLE 7-continued

| | | |
|---|---|---|
| 41 | rsrqResult-r9 OPTIONAL | RSRQ-Range |
| 42 | ISM-InterferenceIndication discussed above) | (the encoding options are |
| 43 | }, | |
| 44 | measResultNeighCells-r9 | SEQUENCE { |
| 45 | measResultListEUTRA-r9 | MeasResultList2EUTRA-r9 |
| 46 | measResultListUTRA-r9 OPTIONAL, | MeasResultList2UTRA-r9 |
| 47 | measResultListGERAN-r9 | MeasResultListGERAN |
| 48 | measResultsCDMA2000-r9 | MeasResultList2CDMA2000-r9 |
| 49 | } OPTIONAL, | |
| 50 | ..., | |
| 51 | [[ locationInfo-r10 | LocationInfo-r10    OPTIONAL, |
| 52 | failedPCellId-r10 | CHOICE { |
| 53 | cellGlobalId-r10 | CellGlobalIdEUTRA, |
| 54 | pci-arfcn-r10 | SEQUENCE { |
| 55 | physCellId-r10 | PhysCellId, |
| 56 | carrierFreq-r10 | ARFCN-ValueEUTRA |
| 57 | } | |
| 58 | } OPTIONAL, | |
| 59 | reestablishmentCellId-r10 OPTIONAL, | CellGlobalIdEUTRA |
| 60 | timeConnFailure-r10 OPTIONAL, | INTEGER (0..1023) |
| 61 | connectionFailureType-r10 OPTIONAL, | ENUMERATED {rlf, hof} |
| 62 | previousPCellId-r10 OPTIONAL | CellGlobalIdEUTRA |
| 63 | ]], | |
| 64 | [[ c-RNTI-r11 OPTIONAL, | C-RNTI |
| 65 | rlf-Cause-r11 | ENUMERATED { |
| 66 | | t310Expiry, randomAccessProblem, |
| 67 | OPTIONAL, | rlc-MaxNumRetx, spare1} |
| 68 | timeSinceFailure-r11 OPTIONAL | INTEGER (0..172800) |
| 69 | ]] | |
| 70 | } | |
| 71 | | |
| 72 | MeasResultList2EUTRA-r9 ::= MeasResult2EUTRA-r9 | SEQUENCE (SIZE (1..maxFreq)) OF |
| 73 | | |
| 74 | MeasResult2EUTRA-r9 ::= | SEQUENCE { |
| 75 | carrierFreq-r9 | ARFCN-ValueEUTRA, |
| 76 | measResultList-r9 | MeasResultListEUTRA |
| 77 | } | |
| 78 | | |
| 79 | MeasResultList2UTRA-r9 ::= MeasResult2UTRA-r9 | SEQUENCE (SIZE (1..maxFreq)) OF |
| 80 | | |
| 81 | MeasResult2UTRA-r9 ::= | SEQUENCE { |
| 82 | carrierFreq-r9 | ARFCN-ValueUTRA, |
| 83 | measResultList-r9 | MeasResultListUTRA |
| 84 | } | |
| 85 | | |
| 86 | MeasResultList2CDMA2000-r9 ::= MeasResult2CDMA2000-r9 | SEQUENCE (SIZE (1..maxFreq)) OF |
| 87 | | |
| 88 | MeasResult2CDMA2000-r9 ::= | SEQUENCE { |
| 89 | carrierFreq-r9 | CarrierFreqCDMA2000, |
| 90 | measResultList-r9 | MeasResultsCDMA2000 |
| 91 | } | |
| 92 | | |
| 93 | LogMeasReport-r10 ::= | SEQUENCE { |
| 94 | absoluteTimeStamp-r10 | AbsoluteTimeInfo-r10, |
| 95 | traceReference-r10 | TraceReference-r10, |
| 96 | traceRecordingSessionRef-r10 | OCTET STRING (SIZE (2)), |
| 97 | tce-Id-r10 | OCTET STRING (SIZE (1)), |
| 98 | logMeasInfoList-r10 | LogMeasInfoList-r10, |
| 99 | logMeasAvailable-r10 OPTIONAL, | ENUMERATED {true} |
| 100 | ... | |
| 101 | } | |
| 102 | | |
| 103 | LogMeasInfoList-r10 ::= OF LogMeasInfo-r10 | SEQUENCE (SIZE (1..maxLogMeasReport-r10)) |
| 104 | | |

TABLE 7-continued

```
105   LogMeasInfo-r10 ::=      SEQUENCE {
106         locationInfo-r10                          LocationInfo-r10   OPTIONAL,
107         relativeTimeStamp-r10                     INTEGER (0..7200),
108         servCellIdentity-r10                      CellGlobalIdEUTRA,
109         measResultServCell-r1 (                   SEQUENCE {
110             rsrpResult-r10                            RSRP-Range,
111             rsrqResult-r10                            RSRQ-Range
112             ISM-InterferenceIndication                (the encoding options are discussed
      above)
113         },
114         measResultNeighCells-r10                  SEQUENCE {
115             measResultListEUTRA-r10                   MeasResultList2EUTRA-r9
      OPTIONAL,
116             measResultListUTRA-r10                    MeasResultList2UTRA-r9
      OPTIONAL,
117             measResultListGERAN-r10                   MeasResultList2GERAN-r10
      OPTIONAL,
118             measResultListCDMA2000-r10                MeasResultList2CDMA2000-r9
119         } OPTIONAL,
120         ...
121   }
122
123   MeasResultList2GERAN-r10 ::=                    SEQUENCE (SIZE
      (1..maxCellListGERAN)) OF MeasResultListGERAN
124
125   ConnEstFailReport-r11 ::=                       SEQUENCE {
126         failedCellId-r11                          CellGlobalIdEUTRA,
127         locationInfo-r11                          LocationInfo-r10
      OPTIONAL,
128         measResultFailedCell-r11                  SEQUENCE {
129             rsrpResult-r11                            RSRP-Range,
130             rsrqResult-r11                            RSRQ-Range
131             ISM-InterferenceIndication                (the encoding options are
      discussed above)
132         },
133         measResultNeighCells-r11                  SEQUENCE {
134             measResultListEUTRA-r11                   MeasResultList2EUTRA-r9
135             measResultListUTRA-r11                    MeasResultList2UTRA-r9
      OPTIONAL,
136             measResultListGERAN-r11                   MeasResultListGERAN
137             measResultsCDMA2000-r11                   MeasResultList2CDMA2000-r9
138         } OPTIONAL,
139         numberOfPreamblesSent-r11                 INTEGER (1..200),
140         contentionDetected-r11                    BOOLEAN,
141         maxTxPowerReached-r11                     BOOLEAN,
142         timeSinceFailure-r11                      INTEGER (0..172800)
      OPTIONAL,
143         ...
144   }
145
146   -- ASN1STOP
```

ISM Interference on neighboring LTE cells can be indicated by usage of the measResultNeighCells-r10 IE, which may contain the MeasResultList2EUTRA-r9 IE, which may in turn contain the MeasResultListEUTRA IE, which may contain the MeasResultEUTRA IE, which is included in table 6 above. ISM Pollution Detection may also be of interest for two other (not primarily MDT related) events that may occur in the serving cell, namely to Radio Link Failure (RLF) and to Connection Establishment Failure (CEF).

ISM Pollution Detection Result Parameters in MDT Report on the Network Side

For example, in case of Immediate-MDT, whenever the base station 304 (or the RNC) receives the MDT measurements from the UE 305 in RRC_CONNECTED, it saves it to a Trace Record.

In case of Logged MDT, the UE 305 for example collects the measurements as long as it is in RRC_IDLE. Once the UE 305 goes to RRC_CONNECTED mode, the UE 305 indicates MDT log availability in a RRCConnectionSetupComplete RRC message to the base station 304 (or RAN node). When the base station 304 (or RAN node) receives this indication it can request the MDT log (if the UE 305 is still in the same RAT type where the MDT configuration was done, or in another RAT that qualifies for MDT log retrieval) by sending a UEInformationRequest RRC message to the UE 305. The UE 305 sends the MDT logs (i.e. the MDT measurement report) to the network in the UEInformationResponse RRC message in 319. At the reception of the UEInformationResponse RRC message the base station 304 (or RAN node) saves the received MDT log.

The Trace Record (e.g. containing an (aggregated) MDT measurement report) is then sent to the TCE 330 by means of a core network message sequence in 321 and 322 via the EM 301. It should be noted that there are certain deployment scenarios where the EM 301 resides inside the RNC (in case of UMTS), or inside the eNodeB 304 (in case of LTE).

The time and criteria when the Trace Records are conveyed to the EM 301 or TCE 330 may be vendor or MNO (Mobile Network Operator) specific. However, if the Trace Session is deactivated, the Trace Records is for example sent to the EM 301 or TCE 330 latest by 2 hours after the Trace Session deactivation.

In the trace-based MDT reporting at least one parameter may be added to inform the EM 301 or TCE 330 about the ISM pollution detection measurement results. For example, the sending trace record message sequence is enhanced and additional pieces of information are added to the Trace Record message sent in 321 and/or 322. In doing so the MDT Reports for the ISM pollution detection measurements use case can be propagated from the base station 304 via the EM 301 (Element Manager) in one or two steps to the TCE 330.

For this either the S1AP (defined for the S1 interface between MME 109 and eNodeB 103 in case of LTE) may be modified in order to convey the MDT Report (including the "ISM Pollution Detection" information) or a protocol is specified (for example defined for the interface(s) between base station 304 and TCE 330).

Possible (alternative) structures for reporting the data collected during ISM pollution detection measurements on the network side are given in tables 8 to 11 (e.g. added into the Trace Record Message).

TABLE 8

| The IE defines the MDT reporting parameters. | Presence | Range | IE type | Semantics description |
|---|---|---|---|---|
| . | . | . | . | . |
| . | . | . | . | . |
| . | . | . | . | . |
| ISM-Pollution-Indicator | O | | BOOLEAN | Value "true" indicates "This set of MDT measurements was prone to ISM interference in the UE". Value "false" indicates "This set of MDT measurements was not prone to ISM interference in the UE". |
| . | . | . | . | . |
| . | . | . | . | . |

TABLE 9

| The IE defines the MDT reporting parameters. | Presence | Range | IE type | Semantics description |
|---|---|---|---|---|
| . | . | . | . | . |
| . | . | . | . | . |
| . | . | . | . | . |
| ISM-Pollution-Indicator | O | | ENUMERATED (tagged, deleted) | Value "tagged" indicates "ISM pollution was detected" and value "deleted" indicates "some MDT measurements were deleted due to ISM interference". |
| . | . | . | . | . |
| . | . | . | . | . |

TABLE 10

(corresponds to encoding example 3 above)

| The IE defines the MDT reporting parameters. | Presence | Range | IE type | Semantics description |
|---|---|---|---|---|
| . | . | . | . | . |
| . | . | . | . | . |
| . | . | . | . | . |
| ISM-Pollution-Indicator | O | | SEQUENCE (SIZE (1 ... max)) | Container for ISM Pollution Indication |
| >Container-Identifier | | | INTEGER | Specifies the number of the record in the ISM-Pollution-Indicator List. |
| >Frequency | | | INTEGER | Specifies the identifier of the LTE frequency where ISM pollution was detected. |

TABLE 10-continued (corresponds to encoding example 3 above)

| The IE defines the MDT reporting parameters. | Presence | Range | IE type | Semantics description |
|---|---|---|---|---|
| >Severeness | | | ENUMERATED (light, medium, heavy) | Value "light" indicates "low ISM interference was detected" and value "medium" indicates "medium ISM interference was detected" and value "high" indicates "severe ISM interference was detected". |
| . | . | . | . | . |
| . | . | . | . | . |
| . | . | . | . | . |

TABLE 11

(corresponds to encoding example 4b above)

| The IE defines the MDT reporting parameters. | Presence | Range | IE type | Semantics description |
|---|---|---|---|---|
| . | . | . | . | . |
| . | . | . | . | . |
| . | . | . | . | . |
| ISM-Pollution-Indicator | O | | SEQUENCE (SIZE (1 . . . max)) | Container for ISM Pollution Indication |
| >Container-Identifier | | | INTEGER | Specifies the number of the record in the ISM-Pollution-Indicator List. |
| >WiFi-Channels | | | ENUMERATED | Specifies the WiFi channel identifiers where ISM Pollution occurred. |
| >Bluetooth-Channels | | | ENUMERATED | Specifies the Bluetooth channel identifiers where ISM Pollution occurred. |
| . | . | . | . | . |
| . | . | . | . | . |
| . | . | . | . | . |

Regarding the propagation of the ISM pollution detection measurement configuration, the ISM pollution detection measurement is for example made an integral part of the MDT configuration. Thus, in case of Immediate-MDT the ISM pollution detection measurement configuration parameters for a UE are for example transferred from a source eNB/RNC (i.e. a source cell) to a target eNB/RNC (i.e. a target cell), e.g. in case of a handover.

In Logged-MDT mode, no propagation of the MDT configuration is for example performed.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
a message generator circuit to generate a message that includes a minimization of drive test (MDT) parameter to indicate that a mobile terminal is to determine whether a transmitter of the mobile terminal transmits in an industrial, scientific, and medical (ISM) band at a time in which the mobile terminal performs an MDT measurement and provide information based on whether the transmitter is determined to transmit in the ISM band at the time in which the mobile terminal performs the MDT measurement; and
a transmitter circuit to transmit the message to the mobile terminal over a radio access network;
wherein the mobile terminal is to refrain from transmitting the MDT measurement based on a determination that the transmitter of the mobile terminal transmits in the ISM band at the time in which the mobile terminal performs the MDT measurement.

2. The communication device according to claim 1, wherein the message indicates that the mobile terminal is to provide information that is processed based on whether the transmitter of the mobile terminal is determined to transmit in the ISM band at the time.

3. The communication device according to claim 1, wherein the information is a result of the MDT measurement carried out by the mobile terminal.

4. The communication device according to claim 3, wherein a receiver and the transmitter of the mobile terminal use different radio technologies.

5. The communication device according to claim 3, wherein the measurement is a measurement of a signal strength or a signal quality of a signal received by a receiver of the mobile terminal.

6. The communication device according to claim 1, wherein the information is to be provided to the communication device and includes an indication of whether the transmitter of the mobile terminal was determined to transmit in the ISM band at the time in which the mobile terminal performs the MDT measurement.

7. The communication device according to claim 1, wherein the transmitter circuit is to transmit the message to the mobile terminal; a core network component; or a radio access network component.

8. The communication device according to claim 1, wherein the transmitter of the mobile terminal is a short range communication transmitter.

9. The communication device according to claim 1, wherein the message is to indicate that the mobile terminal is to make said determination of whether a transmitter transmits in the ISM band at a time in which the mobile terminal performs an MDT measurement for immediate MDT measurements, for logged MDT measurements, for immediate and logged MDT measurements, or for specific measurements for an immediate MDT measurement.

10. The communication device according to claim 1, wherein the information is to be provided to the communication device and is to identify which MDT measurements are affected by transmissions in the ISM band or provide a list of all frequencies affected by transmissions in the ISM band.

11. The communication device of claim 1, wherein the communication device is part of a mobile communication network.

12. The communication device of claim 1, wherein the communication device is a base station.

13. The communication device of claim 1, further comprising:
a receiver circuit to receive the information in an MDT report.

14. One or more non-transitory, computer-readable media having instructions that, when executed, cause a device to
generate a message that includes a minimization of drive test (MDT) parameter to indicate that a mobile terminal is to determine whether a transmitter of the mobile terminal transmits in an industrial, scientific, and medical (ISM) band at a time in which the mobile terminal performs an MDT measurement and provide information based on whether the transmitter is determined to transmit in the ISM band at the time; and
transmit the message,
and wherein the mobile terminal is to refrain from transmitting the MDT measurement based on a determination that the transmitter of the mobile terminal transmits in the ISM band at the time in which the mobile terminal performs the MDT measurement.

15. A mobile terminal comprising:
a receiver circuit to receive a message, over a radio access network, that includes a minimization of drive test (MDT) parameter;
a determiner circuit to determine, based on the MDT parameter, whether a transmitter of the mobile terminal transmit in an industrial, scientific, and medical (ISM) band at a time in which the mobile terminal performs an MDT measurement;
a message generator circuit to generate a message comprising information based on whether the transmitter is determined to transmit in the ISM band at the time in which the mobile terminal performs the MDT measurement; and
a transmitter circuit configured to transmit the message,
wherein the mobile terminal is to refrain from transmitting an MDT measurement based on a determination that the transmitter circuit transmits in the ISM band at the time in which the mobile terminal performs the MDT measurement.

16. The mobile terminal according to claim 15, wherein the information includes an indication of whether the transmitter circuit of the mobile terminal was determined to transmit in the ISM band at the time in which the mobile terminal performs the MDT measurement.

17. The mobile terminal according to claim 15, wherein the MDT parameter is to indicate that the mobile terminal is to make said determination of whether the transmitter circuit transmits in the ISM band at times in which the mobile terminal performs MDT measurements for immediate MDT measurement, for logged MDT measurement, for immediate and logged MDT measurements, or for specific measurements for an immediate MDT measurement.

18. The mobile terminal according to claim 15, wherein the information is to identify which MDT measurements are affected by transmissions in the ISM band or provide a list of all frequencies affected by transmissions in the ISM band.

* * * * *